United States Patent [19]

Okada

[11] 4,310,744
[45] Jan. 12, 1982

[54] A.C. ARC WELDER

[75] Inventor: Toshiyuki Okada, Mino, Japan

[73] Assignee: Osaka Transformer Co., Ltd., Osaka, Japan

[21] Appl. No.: 172,071

[22] Filed: Jul. 24, 1980

[30] Foreign Application Priority Data

Jul. 26, 1979 [JP] Japan .................................. 54-95916

[51] Int. Cl.³ .............................................. B23K 9/09
[52] U.S. Cl. ............................ 219/130.51; 219/130.32
[58] Field of Search ............ 219/130.51, 130.5, 130.1, 219/130.31, 130.32

[56] References Cited

U.S. PATENT DOCUMENTS 4,249,063  2/1981  Kawano et al. ................. 219/130.51

FOREIGN PATENT DOCUMENTS 52-36538  3/1977  Japan ............................. 219/130.51

Primary Examiner—C. C. Shaw
Attorney, Agent, or Firm—Craig and Antonelli

[57] ABSTRACT

An a.c. arc welder includes a reactor between a source of a.c. power and a welding load for accumulating energy during the increase of voltage from the source. A bypass circuit is further provided in parallel to the reactor and the welding load for dissipating the accumulated energy as a welding current through the load.

9 Claims, 49 Drawing Figures

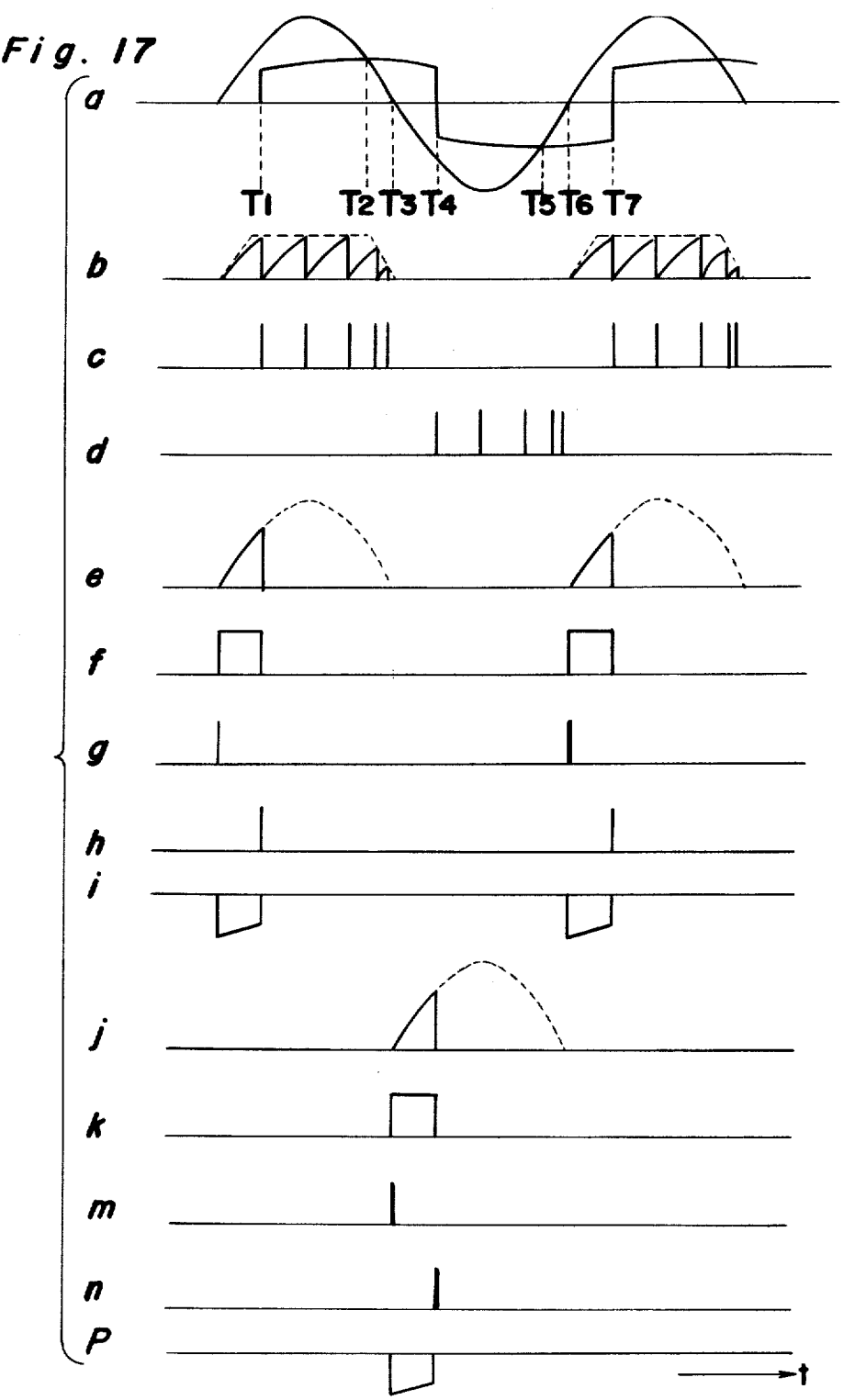

A.C. ARC WELDER

The present invention relates to an a.c. arc welder and, more particularly, to an improved phase-controlled a.c. arc welder.

In general, a.c. arc welders have been widely used in welding a metal, particularly of a type tending to produce a high resistance oxide layer over the weld-deposited surface, such as an aluminum or a magnesium. To produce a stable constant arc during the welding, it is necessary to control the welding current. To meet this end, an arc welder having a movable iron core in its transformer has long been employed to control the welding current but it has been found some disadvantages and inconveniences. By way of example, the adjustment of the output current requires a relatively long time and a time-consuming procedure, such that the output current from the transformer does not quickly respond to the adjustment. In addition, the current lacks stability. Thus, the welder of the type described above is not suitable for use in association with a programmable control.

To improve the response time, an electronic switch, such as a thyristor or a transistor, is employed, which conducts to provide welding current at a certain phase in each half cycle of the a.c. current. However, this welder also has such a disadvantage that the welder often fails to establish arc particularly when the workpiece, e.g., alminum, is charged negative. To prevent this disadvantage, there have been proposed a.c. arc welders provided with one or more reactors, as described below in connection with FIGS. 1 to 6d.

FIGS. 1, 2, 3 and 4 are circuit diagrams showing four major types of phase-controlled a.c. arc welders, each provided with a reactor element or elements. FIGS. 5a and 5b are waveforms obtained at major points in the circuit of FIG. 1, and FIGS. 6a to 6d are circuit diagrams showing a change in the path of current during the welding operation in each cycle of a.c. current in the arc welder of FIG. 1.

In FIG. 1, a reference numeral 101 designates a pair of input terminals adapted for the connection with an a.c. power source E; a reference numeral 102 designates a welding transformer having a primary winding 102p connected to the input terminals 101 and secondary winding 102s; reference numerals 103a and 103b designate first and second uni-directional controlling rectifiers (referred to as thyristors hereinbelow), respectively, which are connected to terminals 102a and 102b of the secondary winding 102s; a reference numerals 104a and 104b designate reactors having approximately equal amount of inductance and connected in series with the thyristors 103a and 103b, respectively; reference numerals 105a and 105b designate firing control circuits connected to the thyristors 103a and 103b for alternately firing the thyristors in a frequency of every half-cycle of a.c. power; a reference numeral 106 designates a consumable or non-consumable electrode; a reference numeral 107 designates an arc; and a reference numeral 108 designates a workpiece connected to the terminal 102b of the secondary winding 102s. The electrode 106, arc 107 and the workpiece 108 constitute a welding load R.

The thyristors 103a and 103b are connected in reverse-biased relation to each other, when viewed from the terminal 102a, to supply welding current alternately in a frequency of every half-cycle of a.c. power in response to the firing pulse from the firing control circuits 105a and 105b, respectively. The reactors 104a and 104b are so arranged that the magnetic flux produced in the reactor iron core by the current flowing through the reactor 104a directs in the same direction as that produced by the current flowing through the reactor 104b.

The description is now directed to the operation of the above described arc welder with reference to FIGS. 5a and 5b and FIGS. 6a to 6d. In FIGS. 5a and 5b, a sinusoidal-waveform represents no-load voltage Eo produced from the secondary winding 102s while a square-waveform represents a voltage drop IoR across the welding load R. It is to be noted that in the graphs of FIGS. 5a and 5b, the axes of abscissas and ordinates represent time and amplitude, respectively.

The firing control circuit 105a for controlling the phase of firing the thyristor 103a produces a firing pulse at a moment T1 shown in FIG. 5a for conducting the thyristor 103a. Upon conduction of the thyristor 103a, the welding current Io flows through the terminal 102a, thyristor 103a, reactor 104a, welding load R and terminal 102b, as shown in FIG. 6a. Before it reaches a moment T2 (symbolized as t<T2), the voltages are such that Eo>IoR, and the polarities at opposite ends of each of the secondary winding 102s, reactor 104a and welding load R are as shown in FIG. 6a. Since the reactance L of the reactor 104a has a considerably large amount, the current Io hardly changes its value. However, according to a careful investigation, it is found that, during said period, the current Io gradually increases. This increment of the current Io and the large amount of reactance L causes the reactor 104a to produce electromotive force $Eo-IoR=e=L(di/dt)$ with the polarities indicated in FIG. 6a and, thus, accumulates energy S1 corresponding to a shaded portion in FIG. 5a.

During t>T2, it becomes such that Eo<IoR. Since the welding current Io gradually decreases in this period, the reactor 104a produces a counter electromotive force $-L(di/dt)$ for dissipating the accumulated energy to flow a welding current through the welding load R in the same direction as the welding current flow through the welding load R during t<T2. It is to be noted that the accumulated energy S1 and dissipated energy S2 have the same amount. As it is described before, since the inductance L of the reactor 104a is considerably large, the welding current Io hardly changes its value and is maintained approximately at a constant level. During t>T3, although the polarity of the voltage Eo is reversed, as shown in FIG. 6c, the continual dissipation of the accumulated energy in the reactor 104a supplies approximately equal level of the welding current Io to the welding load R in the same direction as the welding current flew through the welding load R during t<T3.

At a moment T4 (symbolized as t=T4), a firing pulse is produced from the firing control circuit 105b towards the thyristor 103b for conducting the thyristor 103b. Thereupon, a current flows through a circuit of the terminal 102b of the secondary winding, welding load R, reactor 104b, thyristor 103b and terminal 102a of the secondary winding, as shown in FIG. 6d. The inductance of the circuit just described is considerably small except that of the reactor 104b. Since the direction of magnetic flux in the iron core caused by the current flowing through the reactor 104b during t>T4 is the same as the direction of the magnetic flux in the iron core caused by the current flowing through the reactor 104a during t<T4 and, since the reactance L is considerably large, the current flowing through the reactor 104b, that is, the absolute value of the current flowing through the welding load R is approximately equal to the current flowing through the load R during t<T4. At this moment, the polarity of the welding load R and the reactor 104b is as shown in FIG. 6d, so that the reactor 104a generates an electromotive force providing positive voltage to the cathode of the thyristor 103a. Since, at this moment, the terminal 102a of the secondary winding 102s is already reversed to negative, the thyristor 103a will be brought to a non-conductive state. After the moment T4, a similar operation is repeated.

FIG. 5b shows waveforms similar to that of FIG. 5a, but the firing angle of the firing pulse produced from each of the firing control circuits 105a and 105b is delayed from θ1 to θ2. In FIG. 5b, the energy S1 accumulated by the electromotive force $Eo - I'oR = e = L(di/dt)$ during $Eo > I'oR$ and the energy S2 dissipated during $Eo < I'oR$ have the same amount, wherein I'o is a current flow obtained when the phase is changed to θ2. As apparent from FIG. 5b, when the firing angle is delayed, the moment when the polarity of the current Io' is reversed is delayed, and at the same time, the level of the current Io' is reduced. The operation is similar to that described above with reference to FIGS. 6a to 6d.

As apparent from the foregoing description, the current supplied to the welding load may not take any interception time, even in the case where the level of the welding current is small. Furthermore, the polarity of the current is changed abruptly after each half-cycle of the power supply.

The above described arc welder is disclosed in Japanese Patent Application which has been laid open to public inspection on Mar. 15, 1977 under No. 33855/1977.

FIGS. 2 to 4 show arc welders similar to the arc welder shown in FIG. 1. The arc welder shown in FIG. 2 has first and second secondary windings 102s and 102t for providing separate circuits for the positive and negative half-cycles of the a.c. current from the source E. The arc welder of FIG. 3 has four thyristors 103a, 103b, 103c and 103d connected in the form of a bridge circuit with a reactor 104 connected between a junction between the thyristors 103a and 103c and a junction between thyristors 103b and 103d. The arc welder of FIG. 4 has secondary windings 102b and 102t, four thyristors 103a to 103d and reactor 104 connected as shown.

The arc welder of FIG. 1 is referred to as a principle type arc welder, the arc welder of FIG. 2 is referred to as a parellel type, the arc welder of FIG. 3 is referred to as a bridged type, and the arc welder of FIG. 4 is referred to as a double control type, hereinafter.

Although each of the arc welders described above in connection with FIGS. 1 to 6d has a quick response to stabilize the welding current, and a considerably high voltage at the beginning of each half-cycle to ensure the establishment of the arc, there is such a disadvantage as described below.

When the reactor, e.g., 104a of FIG. 1, starts to dissipate energy at the moment T2, it produces a current in a clockwise direction as shown in FIG. 6b. At this moment, since the terminal 102a of the secondary winding 102s has a positive potential, the current from the reactor 104a will be aided with the current from the secondary winding 102s. Thus, the current from the reactor 104a effective to produce arc will not be reduced. However, after the polarity of the voltage Eo is reversed, i.e., after the moment T3, the potential at the terminal 102a changes to negative, and terminal 102b to positive, as shown in FIG. 6c. Therefore, the current from the reactor 104a will be counteracted by the current from the secondary winding 102s. Thus, in the period T3<t<T4, the current from the reactor 104a will not be fully utilized as an effective current to produce arc. In other words, when viewed in FIG. 5a or 5b, of all dissipated energy S2, only an energy S2a, so-called an effective power, is effectively consumed in the welding load R, whereas an energy S2b, so-called a reactive power, is returned back to the source E without carrying out any work.

Accordingly, in order for the arc welders described above to produce arc during the period T3<t<T4, it is necessary to provide a reactor having a considerably large inductance to produce a current sufficiently large to overcome the opposing current from the source E. Thus, the welder itself becomes heavy and bulky and, at the same time, the power necessary to run the welder becomes high.

Furthermore, since the firing phase of the thyristor must be set within 90°, it is difficult to carry out a precise adjustment.

Accordingly, it is a primary object of the present invention to provide an improved a.c. arc welder which fully utilizes the accumulated energy in the reactor.

It is another object of the present invention to provide an a.c. arc welder of the above described type which is simple in construction and can readily be manufactured at low cost.

In accomplishing these and other objects, an a.c. arc welder according to the present invention comprises a transformer including a primary winding adapted to receive a single phase a.c. current from an a.c. power source and at least one secondary winding. An electrode adapted to produce a welding arc between the electrode and a workpiece is provided. The electrode, arc and workpiece constitute a welding load. The welder further comprises a first welding current path established between opposite ends of the secondary winding. The first welding current path includes a first phase control circuit, a first reactor and the welding load which are connected in series between opposite ends of the secondary winding. The first phase control circuit is responsive to each of positive polarity half-cycles of the a.c. power and provided for allowing current from the secondary winding to pass therethrough in a controlled phase. The first reactor is provided for accumulating an electric power when the voltage from the secondary winding is higher than that across the welding load and dissipating the accumulated power when the voltage from the secondary winding is lower than that across the welding load. A second welding current path is established between opposite ends of the secondary winding and includes a second phase control circuit, a second reactor and the welding load which are connected in series in the second welding current path. The second phase control circuit is responsive to each of negative polarity half-cycles of the a.c. power and provided for allowing current from the secondary winding to pass therethrough in a controlled phase. The second reactor is provided for accumulating an electric power when the voltage from the secondary winding is higher than that across the welding load and dissipating the accumulated power when the voltage from the secondary winding is lower than that across the welding load. The welder of the present invention further comprises a first bypass circuit connected in parallel to the first reactor and the welding load. The first bypass circuit includes a first switching circuit for conducting the first bypass circuit during a period of time which is within a period of dissipation of the power accumulated in the first reactor. A second bypass circuit is connected in parallel to the second reactor and the welding load. The second bypass circuit includes a second switching circuit for conducting the second bypass circuit during a period of time which is within a period of dissipation of the power accumulated in the second reactor.

These and other objects and features of the present invention will become apparent from the following description taken in conjunction with preferred embodiments thereof with reference to the accompanying drawings, throughout which like parts are designated by like reference numerals, and in which:

FIG. 17 is a graph showing waveforms obtained from major points in the circuit of FIG. 16;

Before the detailed description of the preferred embodiments proceeds, it is to be noted that the present invention is described with reference to four major types of a.c. arc welder, which are namely principle type, parallel type, bridged type and double control type, and each type is described with reference to three different control systems, which are transistor control system, gate turn-off (GTO) thyristor control system and thyristor control system.

PRINCIPLE TYPE

Figure 1:
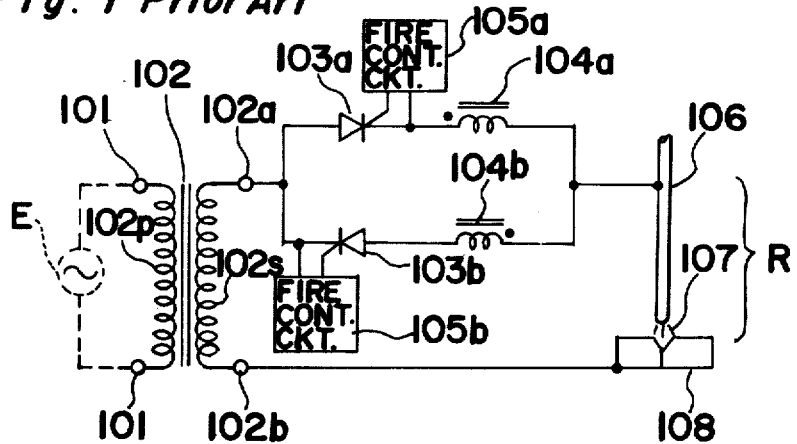
FIG. 1 is a circuit diagram of principle type a.c. arc welder according to the prior art.
Figure 2:
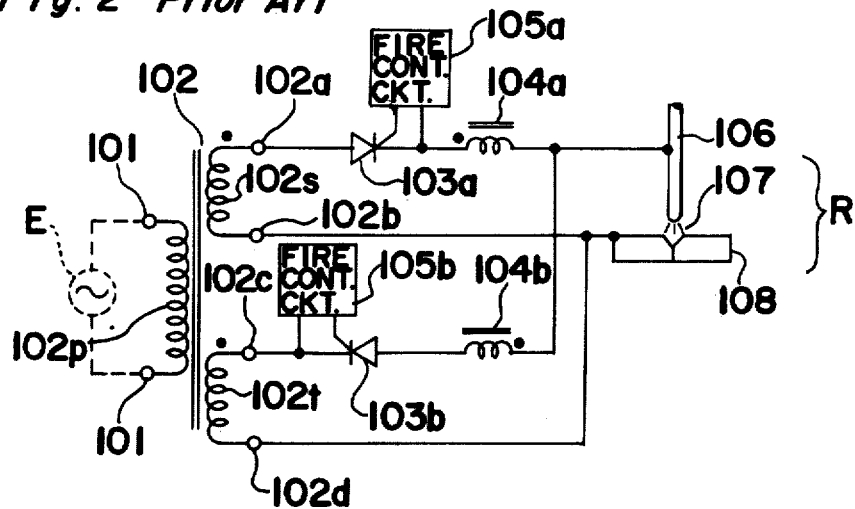
FIG. 2 is a circuit diagram of parallel type a.c. arc welder according to the prior art.
Figure 3:
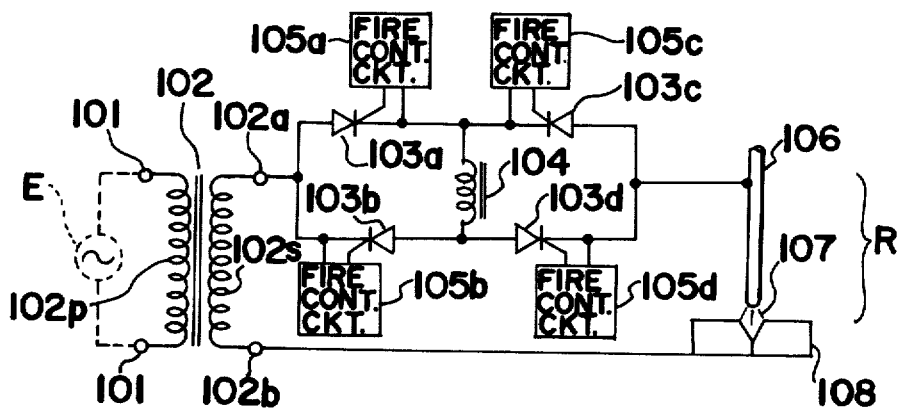
FIG. 3 is a circuit diagram of bridged type a.c. arc welder according to the prior art.
Figure 4:
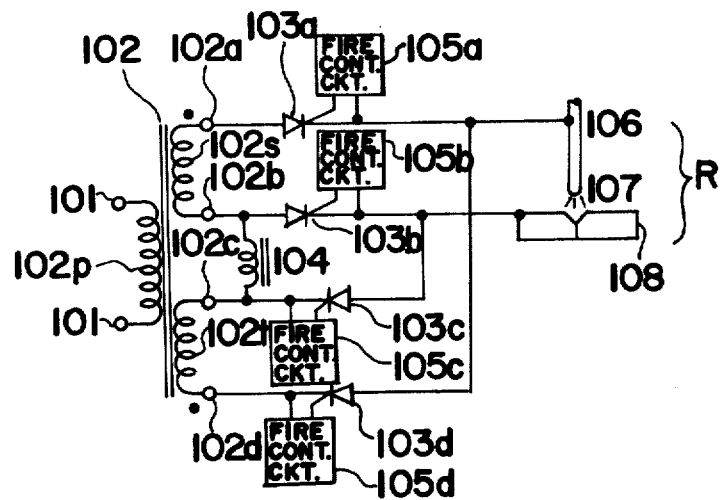
FIG. 4 is a circuit diagram of double control type a.c. arc welder according to the prior art.
Figure 5A:
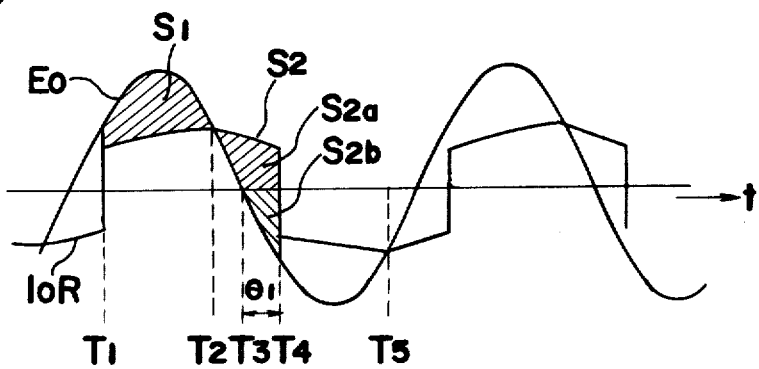
FIGS. 5a and 5b are waveforms obtained from the arc welder of FIG. 1.
Figure 5B:
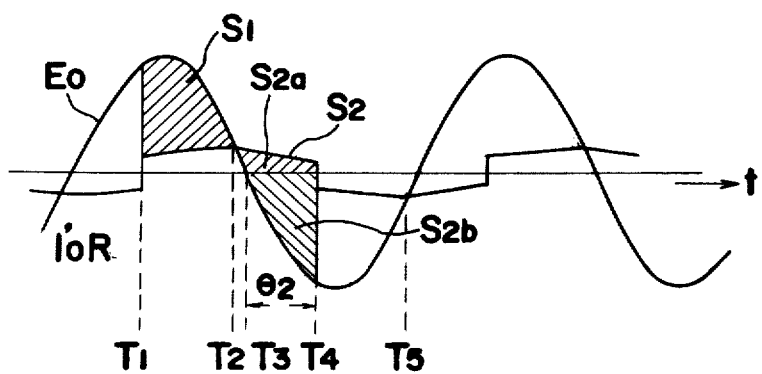
Figure 6A:
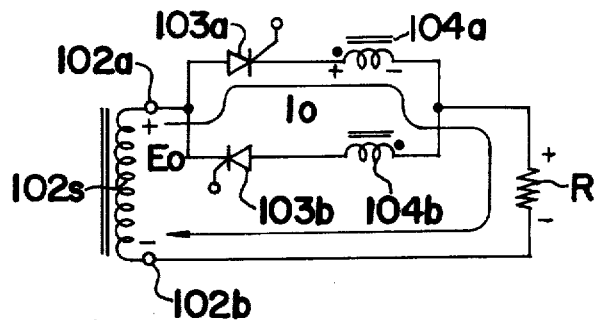
FIGS. 6a to 6d are circuit diagrams for explaining change of current flow through the circuit of FIG. 1.
Figure 6B:
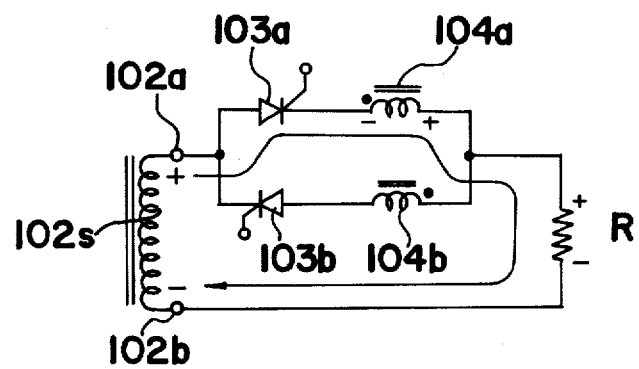
Figure 6C:
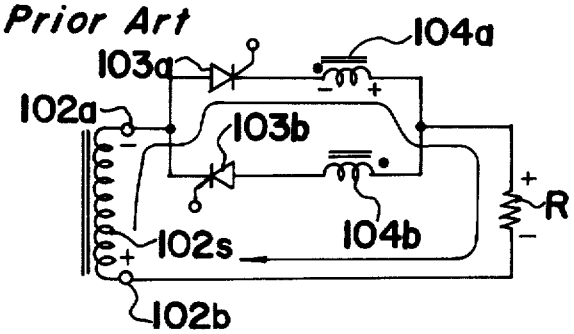
Figure 6D:
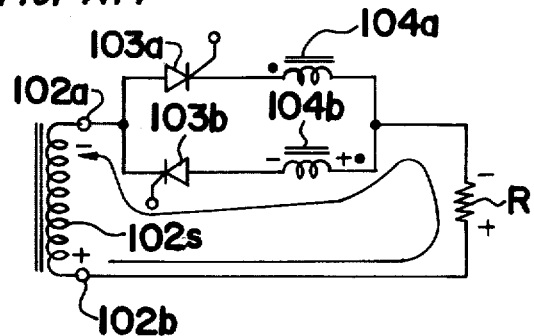
Figure 7:
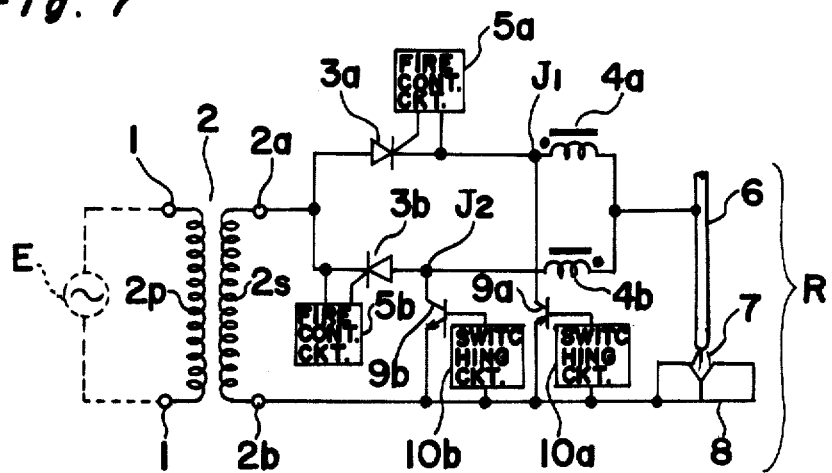
FIG. 7 is a circuit diagram of principle type a.c. arc welder with transistor control system according to the present invention.

Referring to FIG. 7, there is shown a schematic circuit of a principle type a.c. arc welder with transistor control system. The illustrated circuit includes a welding transformer 2 having a primary winding 2p and a secondary winding 2s. The primary winding 2p is connected to a source of electric power E through a pair of terminals 1. The secondary winding 2s has a pair of terminals 2a and 2b, in which the terminal 2a is connected through a series circuit of a thyristor 3a and a reactor 4a to a consumable or non-consumable electrode 6. A series circuit of a thyristor 3b and a reactor 4b is connected in parallel to the series circuit of the thyristor 3a and the reactor 4a. The thyristors 3a and 3b are coupled with fire control circuits 5a and 5b, respectively, and are connected in reverse-biased relation to each other, when viewed from the terminal 2a, to supply welding current alternately in a frequency of every half-cycle of a.c. power in response to the firing pulse from the firing control circuits 5a and 5b. A junction J1 between the thyristor 3a and the reactor 4a is connected through a transistor 9a to the terminal 2b of the secondary winding 2s. Similarly, a junction J2 between the thyristor 3b and the reactor 4b is connected through a transistor 9b to the terminal 2b of the secondary winding 2s. The transistors 9a and 9b are coupled with switching circuits 10a and 10b, respectively, for turning on and off the transistors 9a and 9b. A workpiece 8 positioned close to the electrode 6 is connected to the terminal 2b of the secondary winding 2s. The electrode 6, workpiece 8 and an arc established therebetween constitute a welding load R.

The operation of the welder of FIG. 7 is described with reference to FIGS. 8a and 8b and FIGS. 9a to 9f.

Figure 8A:
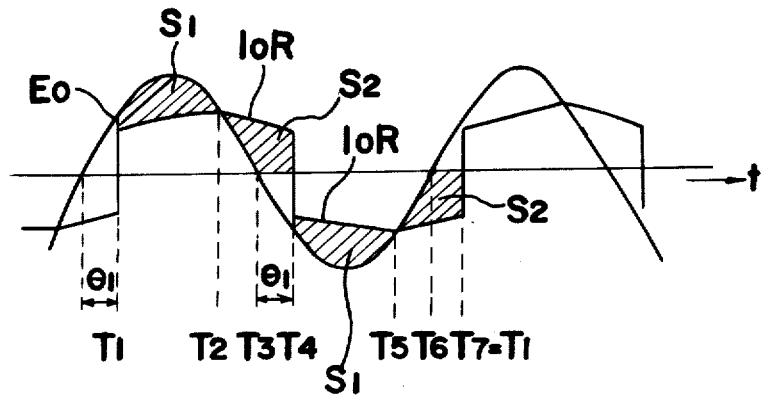
FIGS. 8a and 8b are waveforms obtained from the arc welder of FIG. 7.
Figure 8B:
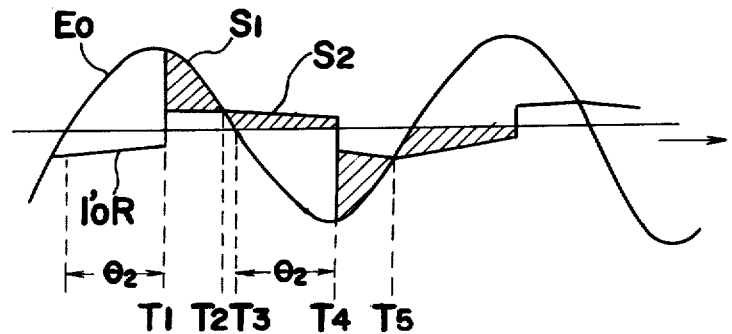

In FIGS. 8a and 8b, a sinusoidal-waveform represents voltage Eo produced across the secondary winding 2s and a square-waveform represents a voltage drop IoR across the welding load R. The axes of abscissas and ordinates in the graphs of FIGS. 8a and 8b represent time and amplitude, respectively. In FIGS. 9a to 9f, arrows show passages of the current flow at different welding moments.

Figure 9A:
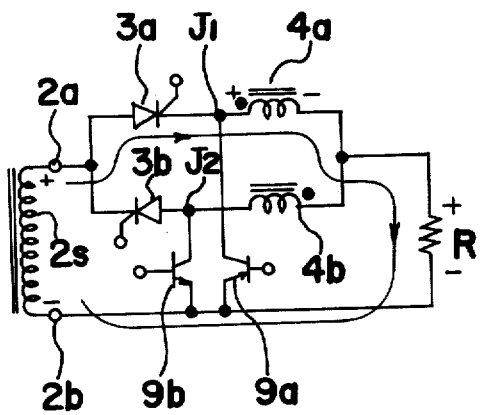
FIGS. 9a to 9f are circuit diagrams for explaining change of current flow through the circuit of FIG. 7.
Figure 9B:
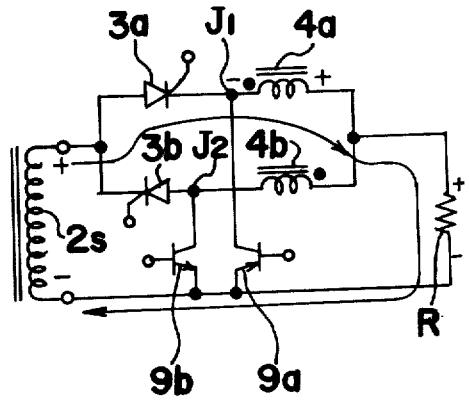
Figure 9C:
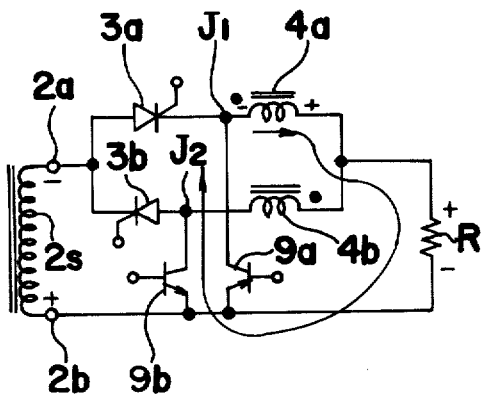
Figure 9D:
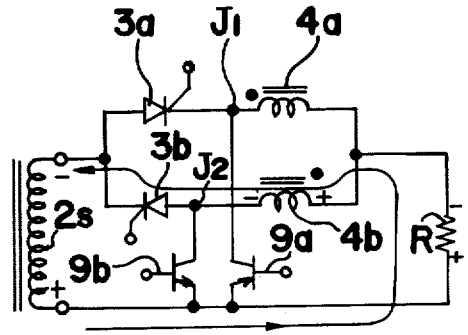

In the positive cycle of the a.c. voltage appearing across the secondary winding 2s, and at a predetermined phase $\theta 1$ corresponding to a moment T1 in FIG. 8a, the fire control circuit 5a is so actuated as to provide a firing pulse to the thyristor 3a. Thereupon, a current flows through the thyristor 3a, reactor 4a and welding load R in a direction indicated by an arrow in FIG. 9a to produce a welding arc 7 between the electrode 6 and the workpiece 8. During T1<t<T2, the voltage are such that Eo>IoR, and the polarities at opposite ends of each of the secondary winding 2s, reactor 4a and welding load R are as shown in FIG. 9a. During this period, the reactor 4a produces an electromotive force $Eo - IoR = e = L(di/dt)$ with the polarities indicated in FIG. 9a and, thus, accumulates energy S1 corresponding to a shaded portion in FIG. 8a.

During t>T2, it becomes such that Eo<IoR. Since the welding current Io gradually decreases in this period, the reactor 4a produces a counter electromotive force −L(di/dt) for dissipating the accumulated energy to flow a welding current through the welding load R (FIG. 9b) in the same direction as the welding current flew through the load R during t<T2. Therefore, the current from the reactor 4a will be aided with the current from the secondary winding 2s. Thus, the current from the reactor 4a is effective to produce arc 7 between the electrode 6 and the workpiece 8.

At a moment T3, that is, a moment when the polarity of the voltage Eo changes, the switching circuit 10a is so actuated as to turn the transistor 9a on, thus, establishing a bypass circuit between the workpiece 8 and the junction J1. At this moment, the thyristor 3a is automatically turned off. Thus, the dissipation of the energy in the reactor 4a is carried out by the current flow through the welding load R and the bypass circuit constituted by the transistor 9a as indicated by an arrow in FIG. 9c. Therefore, the energy accumulated in the reactor 4a will not be fed back to the source E but is efficiently used to establish the welding arc. In other words, when viewed in FIG. 8a, all the dissipated energy S2, which is equal to the accumulated energy S1, is used to create the arc 7. From this standpoint, the reactor 4a employed in the welder of the present invention can be formed in a size smaller than that employed in the conventional welder to dissipate the same amount of energy effective to produce welding arc.

At a moment T4, that is, a moment when the predetermined phase $\theta$ is advanced in the negative cycle of the a.c. voltage Eo, the actuation of the switching circuit 10a ends to turn the transistor 9a off and, at the same time, a firing pulse is produced from the fire control circuit 5b to turn the thrystor 3b to a conductive state. Accordingly, the bypass circuit established by the transistor 9a is cut off and the welding current flows between the terminals 2a and 2b of the secondary winding 2s through the thyristor 3b, reactor 4b and welding load R, as shown by an arrow in FIG. 9d. During this current flow, an energy S1 corresponding to the shaded portion in the negative half cycle shown in FIG. 8a, is accumulated in the reactor 4b.

Figure 9E:
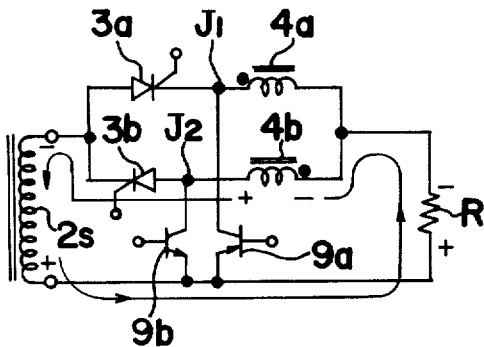
Figure 9F:
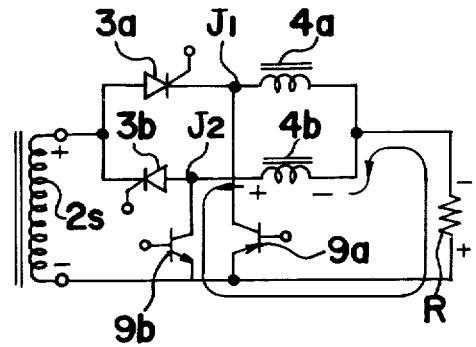

When the voltage IoR across the welding load R becomes equal to the voltage across the terminals 2a and 2b as occured at a moment T5, the energy accumulated in the reactor 4b starts to dissipate by a current flow through the path as shown by an arrow in FIG. 9e.

At a moment T6, when the polarity of the voltage Eo changes, the switching circuit 10b is actuated to turn the transistor 9b on and, thus, establishing a bypass circuit between the workpiece 8 and the junction J2. At this moment, the thyristor 3b is automatically turned off. Thus, the dissipation of the energy in the reactor 4b is carried out by the current flow through the welding load R and the bypass circuit constituted by the transistor 9b as shown by an arrow in FIG. 9f. The flow of the current through the bypass circuit constituted by the transistor 9b continues until the fire control circuit 5a produces a firing pulse to start a new cycle of operation.

It is to be noted that the timing for establishing the bypass circuit, e.g., the one constituted by the transistor 9a should not necessarily be at the moment T3, that is, when the polarity of the voltage Eo changes, but can be at any moment during the dissipation of the energy accumulated in the reactor. For example, in the case of bypass circuit constituted by the transistor 9a, the switching circuit 10a can be actuated at any moment between T2 and T4. However, when the turning on moment of the transistor 9a falls between T2 and T3 and as it reaches close to the moment T2, the supply of welding current from the secondary winding 2s to establish welding arc becomes small. On the other hand, when the turning on moment of the transistor 9a falls between T3 and T4 and as it reaches close to the moment T4, the supply of welding current from the reactor 4a becomes small. Therefore, from this standpoint, it is understood that the welding current is supplied most sufficiently to the welding load R when the transistor 9a is turned on at the moment T3.

It is also to be noted that the timing for cutting off the bypass circuit, e.g., the one with the transistor 9a should not necessarily be at the moment T4, that is, when the firing pulse is applied to the thyristor 3b, but it can be at a moment a little before or after the moment T4. In the case where the bypass circuit, e.g., the one with the transistor 9a is cut off before the thyristor 3b conducts, the energy still remaining in the reactor 4a provides a high voltage across the transistor 9a. Therefore, in this case, the transistor 9a should be of a type capable of withstanding high voltage, or otherwise it should be provided with a protection circuit.

Referring to FIG. 8b, there is shown waveforms obtained when the firing phase $\theta$ is delayed to reduce the welding power. Since the energy accumulated in the reactor 4a or 4b can be fully utilized as an effective power to carry out the welding, it is possible to delay the firing phase $\theta$ more than 90°. Therefore, it is possible to carry out a precise control of the welding current applied to the load R.

Figure 10:
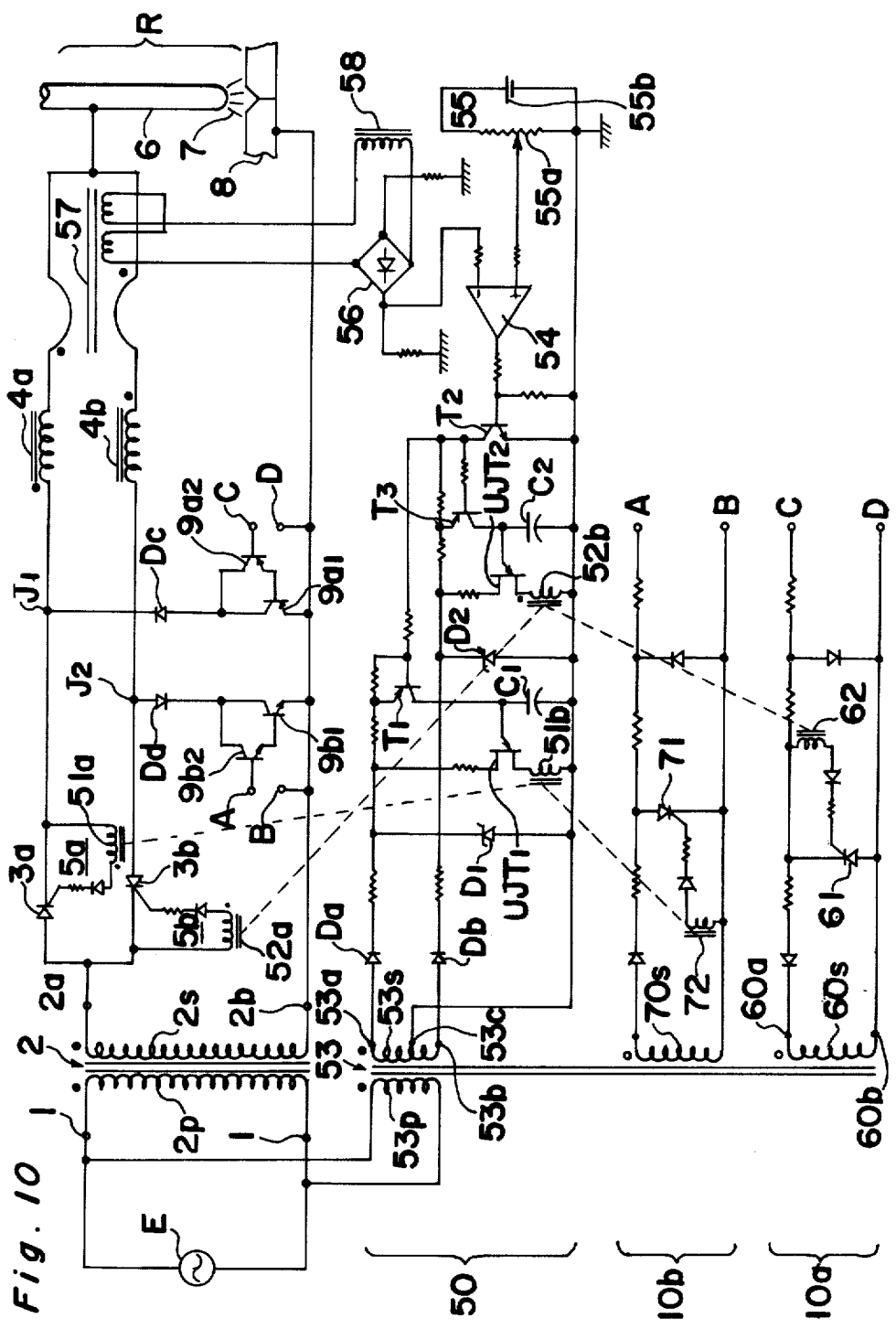
FIG. 10 is a detailed circuit diagram of the circuit of FIG. 7.

Referring to FIG. 10, there is shown one specific circuit diagram used for the principle type a.c. arc welder with transistor control system. In FIG. 10, the fire control circuits 5a and 5b include windings 51a and 52a, respectively, which are assembled in association with a firing pulse generator 50. The firing pulse generator 50 includes a transformer 53 having a primary winding 53p and a secondary winding 53s. The primary winding 53p is connected in parallel to the primary winding 2p of the welding transformer 2. The secondary winding 53s of the transformer has a pair of end taps 53a and 53b and also a center tap 53c in which the center tap 53c is connected to ground. The end tap 53a is connected through suitable diode Da and resistor to a diode D1 and further to ground. A series circuit of a resistor, a unijunction transistor UJT1 and a winding 51b is connected in parallel to the diode D1. Also a series circuit of a transistor T1 and a capacitor C1 is connected in parallel to the diode D1. A junction between the transistor T1 and the capacitor C1 is connected the emitter of the transistor UJT1. The winding 51b has a core which is in common with the winding 51a so that the signal generated in the winding 51b is transferred to the winding 51a. The base of the transistor T1 is connected through a suitable resistor to a collector of a transistor T2. The emitter of the transistor T2 is connected to ground.

The other end tap 53b of the secondary winding 53s is connected through suitable diode D6 and resistor to a diode D2 and further to ground. A series circuit of a resistor, a unijunction transistor UJT2 and a winding 52b is connected in parallel to the diode D2. Also a series circuit of a resistor, a transistor T3 and a capacitor C2 is connected in parallel to the diode D2. A junction between the transistor T3 and the capacitor C2 is connected to the emitter of the transistor UJT2. The winding 52b has a core which is in common with the winding 52a so that the signal generated in the winding 52b is transferred to the winding 52a. The base of the transistor T3 is connected through a suitable resistor to the collector of the transistor T2.

The firing pulse generator 50 further includes a comparator 54 having its one input connected to a voltage setting circuit 55 constituted by a rheostat 55a and a source of voltage 55b. The other input of the comparator 54 is connected through a bridged rectifier 56 to a saturation reactor 57 which detects the welding current supplied to the workpiece 8. A winding 58 having its primary side in common with the winding 53p of the transformer 53 is connected between the bridged rectifier 56 and the saturation reactor 57 for exciting the saturation reactor 57.

Instead of only one transistor 9a, the bypass circuit between the junction J1 and the workpiece 8 in the circuit of FIG. 10 is constituted by a protection diode Dc and transistors 9a1 and 9a2 which are connected in Darlington circuit. Similarly, the bypass circuit between the junction J2 and the workpiece 8 is constituted by a protection diode Dd and transistors 9b1 and 9b2 connected in Darlington circuit. The terminals C and D shown in the former bypass circuit are connected to the corresponding terminals C and D of the switching circuit 10a shown at the bottom of FIG. 10 whereas the terminals A and B shown in the latter bypass circuit are connected to the corresponding terminals A and B of the switching circuit 10b shown in FIG. 10.

The switching circuit 10a includes a secondary winding 60s having a pair of taps 60a and 60b. A thyristor 61 is connected between the taps 60a and 60b through suitable diode and resistor. The gate of the thyristor 61 is connected through a resistor and a diode to a winding 62 which has its core in common with that of the winding 52b for transmitting a signal generated in the winding 52b to the gate of the thyristor 61. The terminal C is connected through resistors to the winding 62 and the terminal D is connected to the tap 60b.

The switching circuit 10b has a similar structure to that of the switching circuit 10a described above and includes winding 70s, thyristor 71 and winding 72. The winding 72 has its core in common with that of the winding 51b for transmitting a signal generated in the winding 51b to the gate of the thyristor 71.

The operation of the circuit of FIG. 10 is now described with reference to waveforms shown in FIG. 11.

The sinusoidal waveform across the terminals 1 is transferred to the secondary winding 53s of the transformer 53. In the positive half-cycle of the a.c. voltage, the waveform of voltage across the winding 53s is reshaped by the diode D1 to a waveform shown by a dotted line in a row b of FIG. 11. This dotted line waveform appearing at the cathode side of the diode D1 is impressed across the capacitor C1 to gradually increase the voltage at the emitter of the transistor UJT1. When the emitter voltage of the transistor UJT1 reaches a predetermined voltage, the transistor UJT1 is so actuated as to conduct its emitter with its base connected with the winding 51b. Accordingly, the capacitor C1 is discharged through the winding 51b to produce a pulse from the winding 51b. Then, the capacitor C1 is again gradually charged to repeat the same operation. Therefore, during the positive half-cycle of the a.c. voltage, sawtooth waves are produced across the capacitor C1 as shown by a real line in a row b of FIG. 11. Everytime when the capacitor C1 is discharged, a pulse signal is generated in the winding 51b to excite associated windings 51a and 72. Thus, the windings 51a and 72 produce pulse signals as indicated in a row c of FIG. 11. The timing in which the pulse signals are generated is determined by the conductivity of the transistor T1, which is further controlled by the transistor T2.

Figure 11:
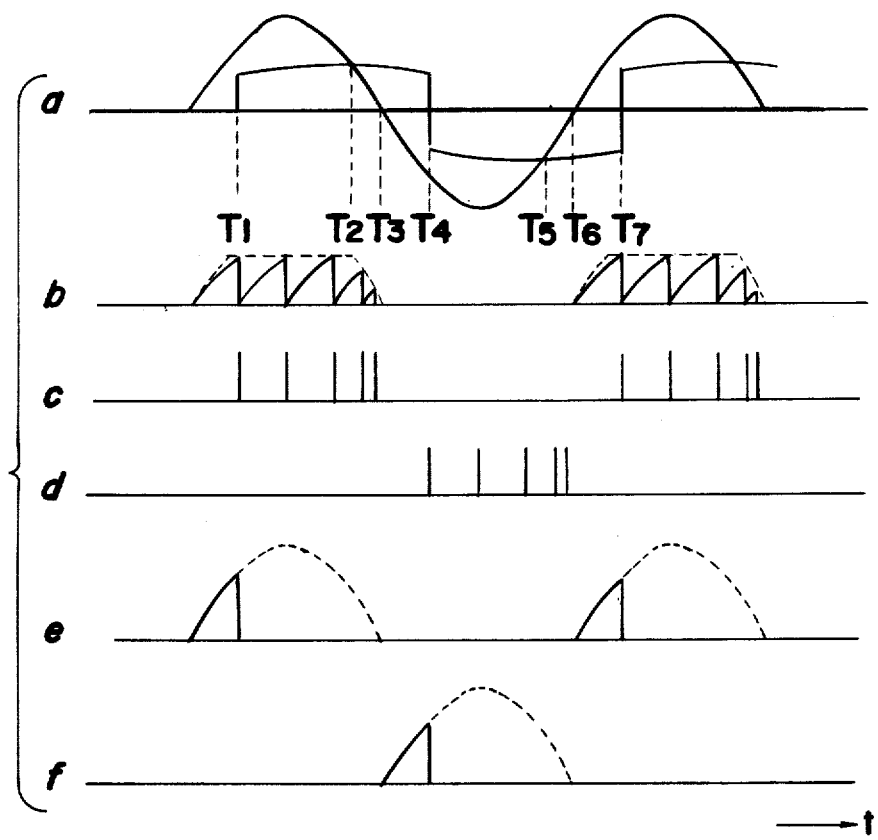
FIG. 11 is a graph showing waveforms obtained from major points in the circuit of FIG. 10.

During the negative half-cycle of the a.c. voltage, a similar charging operation is carried out in the capacitor C2 to generate pulse signals, as indicated in a row d of FIG. 11, from the winding 52b. These pulse signals appear across the windings 51b and 62.

As mentioned above, the timing for generating pulse signals across the winding 51b is determined by the conductivity of the transistor T1, whereas the timing for generating pulse signals across the winding 52b is determined by the conductivity of the transistor T3. The conductivity of the transistors T1 and T3 is controlled simultaneously by the transistor T2. The manner in which the transistors T1 and T3 are controlled is described later.

The operation of the switching circuit 10a is as follows. During the negative half-cycle of the a.c. voltage, the voltage across the winding 60s appears between the terminals C and D from the beginning of the negative half-cycle until the winding 62 is excited to provide firing pulse to the thyristor 61 to short-circuit the terminals 60a and 60b. It is needless to say that no signal appears between the terminals C and D during the positive half-cycle of the a.c. voltage. Accordingly, the voltage in a form of sawtooth as shown in a row f of FIG. 11 is produced between the terminals C and D. Likewise, the switching circuit 10b produces sawtooth signal in the positive half-cycle of the a.c. voltage as shown in a row e of FIG. 11.

A thorough operation of the circuit of FIG. 10 is now described. At the moment T1, the winding 51b produces the first pulse (row c of FIG. 11) which is applied through the winding 51a to the thyristor 3a to flow welding current from the terminal 2a to the load R. During this current flow, energy is accumulated in the reactor 4a. When the voltage across the load R becomes equal to the voltage at the terminal 2a, that is, at the moment T2, the energy accumulated in the reactor 4a starts to dissipate in a form of current, aiding the current from the terminal 2a. Then, when the polarity of the a.c. voltage changes from positive to negative (moment T3), the switching circuit 10a starts to produce signal (row f of FIG. 11) to conduct the transistor 9a1. Accordingly, the current from the reactor 4a flows through the bypass circuit constituted by the transistor 9a1. Thereafter, at the moment T4, the winding 52b generates a pulse signal (row d of FIG. 11) to cut off the signal across the terminals C and D and also to conduct the thyristor 3b. Accordingly, the welding current flows from the terminal 2b through the load R to the terminal 2a. During this current flow, energy is accumulated in the reactor 4b. Then, at the moment T6, the transistor 9b1 is conducted by the signal (row e of FIG. 11) generated from the switching circuit 10b to flow the current from the reactor 4b through the bypass circuit constituted by the transistor 9b1. Thereafter, at the moment T7, the winding 51b is excited again to produce a pulse which cuts off the signal across the terminals A and B and conducts the thyristor 3a. After the moment T7, a similar operation is repeated.

During the above described operation, the welding current is maintained in a predetermined level set by the rheostat 55a in a manner described below. When the welding current exceeds the predetermined value, the voltage at the negative input of the comparator 54 exceeds that at the positive input of the comparator 54. Thus, the comparator 54 produces a low level signal, which is applied to the base of the transistor T2. Accordingly, the conductivity of the transistor T2 is lowered to increase the base voltage of the transistors T1 and T3. Thus, the conductivity of each of the transistors T1 and T3 is lowered to increase the time constant of the capacitors C1 and C2, resulting in a longer period of time to charge the capacitors C1 and C2. Thus, the timing at which the first pulse from each of the windings 51b and 52b is produced is delayed. As a consequence, the welding current is reduced to the predetermined level set by the rheostat 55a. A similar operation is carried out when the welding current becomes lower than the predetermined level.

Figure 12:
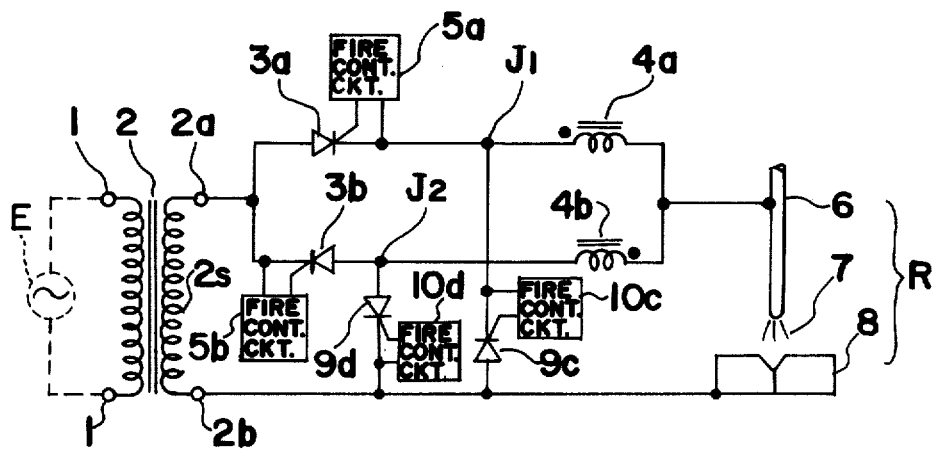
FIG. 12 is a circuit diagram of principle type a.c. arc welder with gate turn-off thyristor control system according to the present invention.

Referring to FIG. 12, there is shown a schematic circuit of a principle type a.c. arc welder with GTO thyristor control system. Instead of transistors 9a and 9b as indicated in FIG. 7, this arc welder has gate turn-off (GTO) thyristors 9c and 9d, respectively, to constitute the bypass circuits. The GTO thyristors 9c and 9d are controlled by the fire control circuits 10c and 10d, respectively. A detailed circuit for this arc welder is shown in FIG. 13 in which only the parts which are different from the circuit of FIG. 10 are described.

Figure 13:
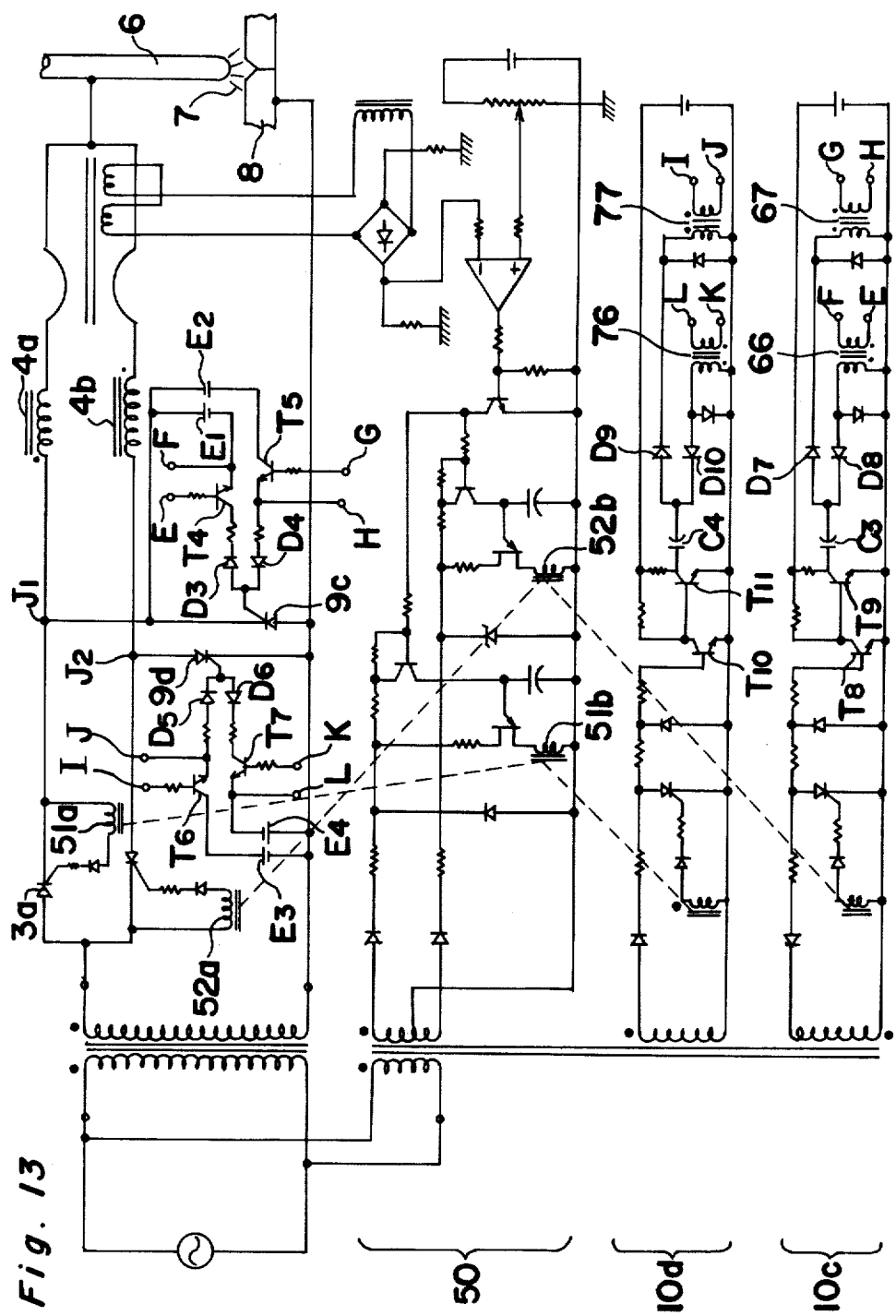
FIG. 13 is a detailed circuit diagram of the circuit of FIG. 12.

In FIG. 13, the GTO thyristor 9c constituting the bypass circuit between the junction J1 and the workpiece 8 has a gate which is connected through diode D3, suitable resistor, transistor T4 and battery E1 to the cathode of the GTO thyristor 9c. The base and emitter of the transistor T4 are connected to terminals E and F, respectively. When a pulse signal is applied between the terminals E and F, a negative going pulse is applied to the gate of the GTO thyristor 9c for turning off the same. The gate of the GTO thyristor 9c is also connected through diode D4, suitable resistor, transistor T5 and battery E2 to the cathode of the GTO thyristor 9c. The base and emitter of the transistor T5 are connected to terminals G and H, respectively. When a pulse signal is applied between the terminals G and H, a positive going pulse is applied to the gate of the GTO thyristor for turning on the same. The terminals E, F, G and H are connected to the corresponding terminals in the fire control circuit 10c which will be described later.

Similar to the GTO thyristor 9c, the GTO thyristor 9d has a gate which is connected through diode D5, suitable resistor, transistor T6 and battery E3 to the cathode side of the GTO thyristor 9d. The base and emitter of the transistor T6 are connected to terminals I and J, respectively. When a pulse signal is applied between the terminals I and J, a positive going pulse is applied to the gate of the GTO thyristor 9d for turning on the same. The gate of the GTO thyristor 9d is also connected through diode D6, suitable resistor, transistor T7 and battery E4 to the cathode side of the GTO thyristor 9d. The base and emitter of the transistor T7 are connected to terminals K and L, respectively. When a pulse signal is applied between the terminals K and L, a negative going pulse is applied to the gate of the GTO thyristor 9d for turning off the same. The terminals I, J, K and L are connected to corresponding terminals in the fire control circuit 10d described later.

The fire control circuit 10c has, as shown at the bottom of FIG. 13, a network similar to that of the switching circuit 10a shown in FIG. 10, but further includes transistors T8 and T9, capacitor C3, diodes D7 and D8 and pulse transformers 66 and 67. It is to be noted that the capacitor C3, diode D7 and winding of the pulse transformer 67 constitute a first differentiation circuit, and the capacitor C3, diode D8 and winding of the pulse transformer 66 constitutes a second differentiation circuit. The secondary winding of the transformer 66 is connected between terminals E and F, while the secondary winding of the transformer 67 is connected between terminals G and H. Similarly, the fire control circuit 10d has a network similar to that of the switching circuit 10b shown in FIG. 10, but further includes transistors T10 and T11, capacitor C4, diodes D9 and D10 and transformers 76 and 77. The secondary winding of the transformer 76 is connected between terminals K and L, while the secondary winding of the transformer 77 is connected between terminals I and J.

The operation of the circuit of FIG. 13 is described below.

Figure 14:
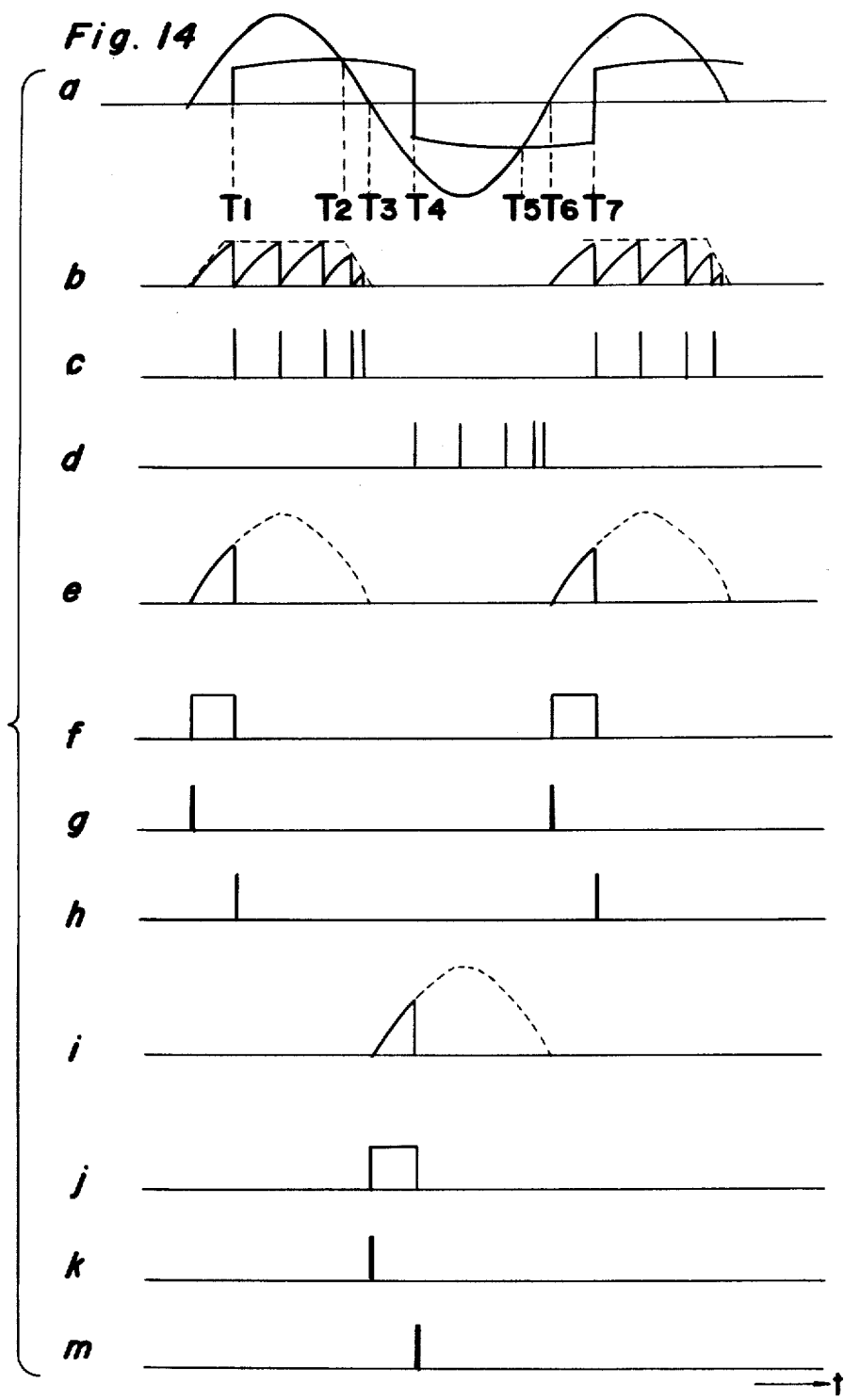
FIG. 14 is a graph showing waveforms obtained from major points in the circuit of FIG. 13.

In the positive half-cycle of the a.c. voltage, the winding 51b is excited to generate pulse which is transferred to the winding 51a for conducting the thyristor 3a. Thereupon, welding current is applied through the junction J1, reactor 4a to the welding load R in the same manner described above. When the cycle is inverted from positive to negative, a sawtooth waveform as shown in a row i of FIG. 14 is applied to the base of the transistor T8. Thereupon, a rectangular pulse having a waveform as shown in a row j of FIG. 14 is produced from the collector of the transistor T9. By the step up of the rectangular pulse, the first differentiation circuit mentioned above is so actuated as to generate a pulse as shown in a row k of FIG. 14 at the moment T3 between the terminals G and H. Likewise, by the step down of the rectangular pulse, the second differentiation circuit is so actuated as to generate a pulse as shown in a row m of FIG. 14 at the moment T4 between the terminals E and F. The pulse produced from the terminals G and H is used for turning the thyristor 9c on and the pulse produced from the terminals E and F is used for turning the thyristor 9c off. Therefore, the thyristor 9c is maintained in a conductive state during a time interval between the moments T3 and T4 for establishing the bypass circuit between the junction J1 and the workpiece 8 in that period to allow the dissipation of accumulated energy in the reactor 4a. Approximately at the same time when the pulse is produced from the terminals E and F, the first pulse in the negative half-cycle is produced from the winding 52b (row d of FIG. 14) to conduct the thyristor 3b. Thereafter, at the moment T6, a pulse is produced from the terminals I and J to turn the thyristor 9d on, and, at the moment T7, a pulse is produced from the terminal K and L to turn the thyristor 9d off. Then, another cycle of operation is repeated.

Figure 15:
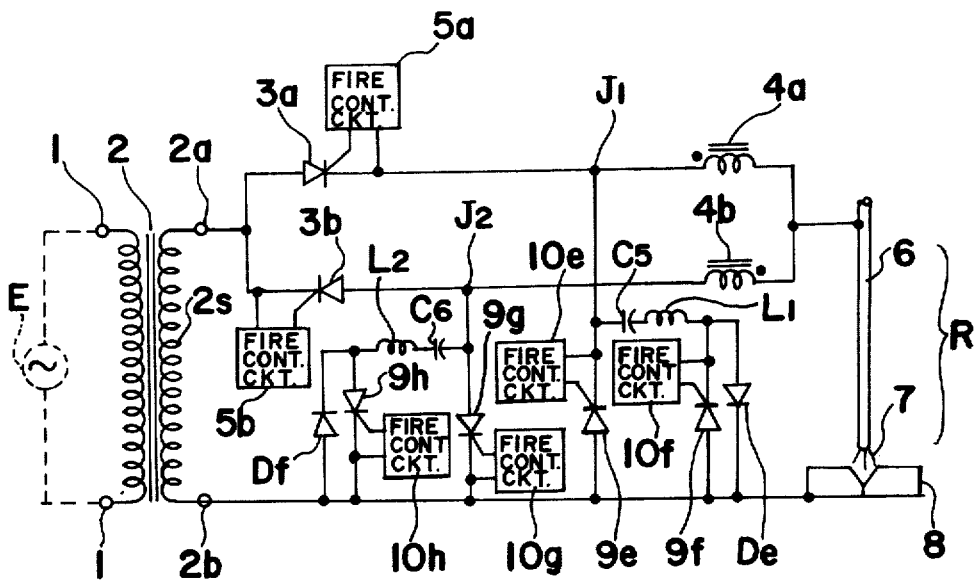
FIG. 15 is a circuit diagram of principle type a.c. arc welder with thyristor control system according to the present invention.

Referring to FIG. 15, there is shown a schematic circuit of a principle type a.c. arc welder with thyristor control system. The bypass circuit between the junction J1 and the workpiece 8 in this embodiment is constituted of a thyristor 9e which is controlled by the fire control circuit 10e. A series circuit of a capacitor C5, an inductor L1 and a thyristor 9f which is controlled by the fire control circuit 10f is connected parallel to the thyristor 9e. Furthermore, a diode De is connected parallel to the thyristor 9f. Similarly, the bypass circuit between the junction J2 and the workpiece 8 includes thyristors 9g and 9h, which are controlled by fire control circuits 10g and 10h, respectively, a capacitor C6, an inductor L2 and a diode Df. A detailed circuit for this arc welder is shown in FIG. 16.

Figure 16:
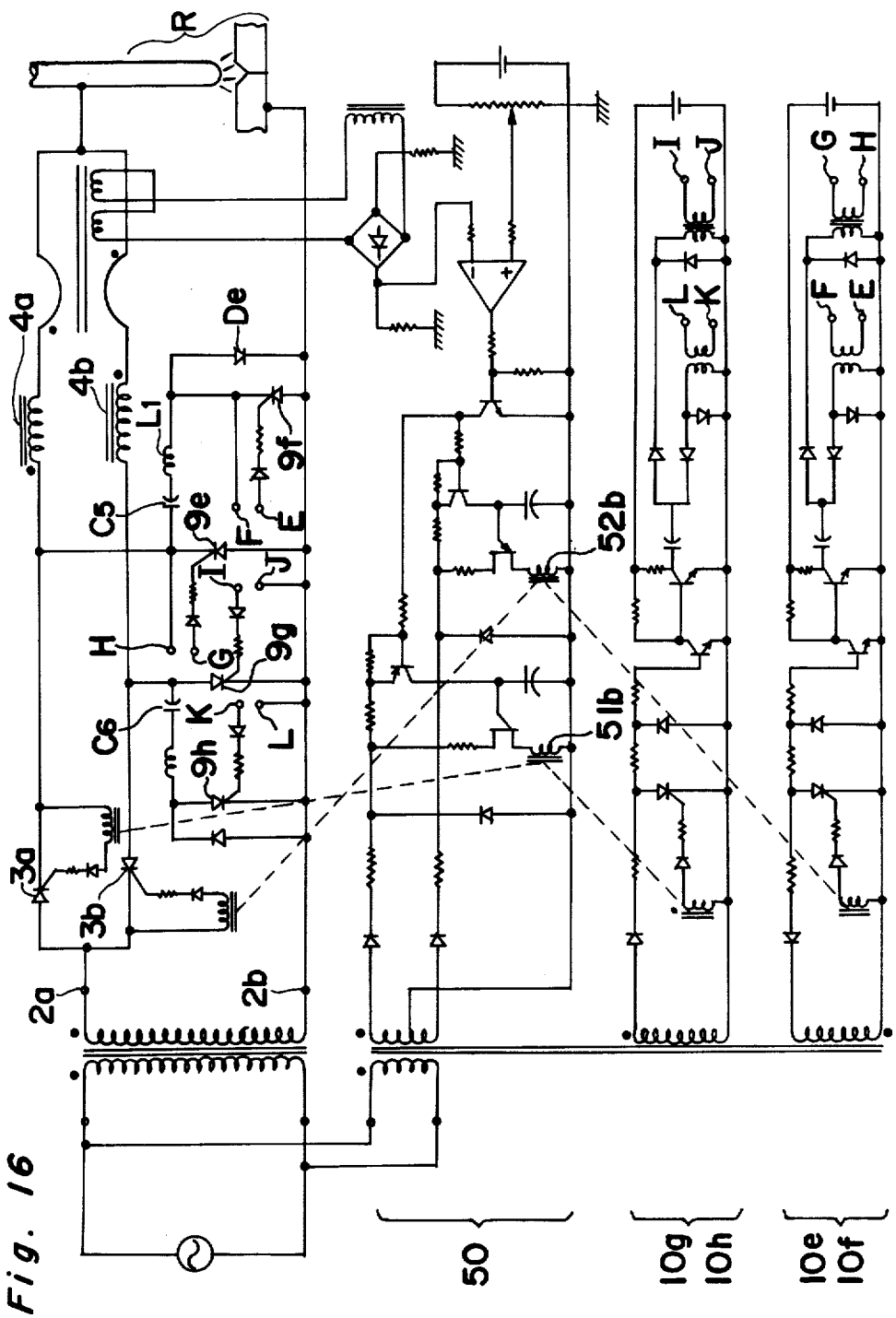
FIG. 16 is a detailed circuit diagram of the circuit of FIG. 15.

Referring to FIG. 16, a combined circuit of the fire control circuits 10e and 10f which has been described as connected to the thyristors 9e and 9f, respectively, has an identical network as the fire control circuit 10c shown in FIG. 13, and a combination circuit of the fire control circuits 10g and 10h which has been described as connected to the thyristors 9g and 9h, respectively, has an identical network as the fire control circuit 10d shown in FIG. 13. The terminals G and H of the combination circuit of circuits 10e and 10f are so connected as to control the thyristor 9e, and the terminals E and F are so connected as to control the thyristor 9f. Likewise, the terminals I and J are so connected as to control the thyristor 9g, and the terminals L and K are so connected as to control the thyristor 9h. The operation of the circuit of FIG. 16 is described below.

Figure 30:
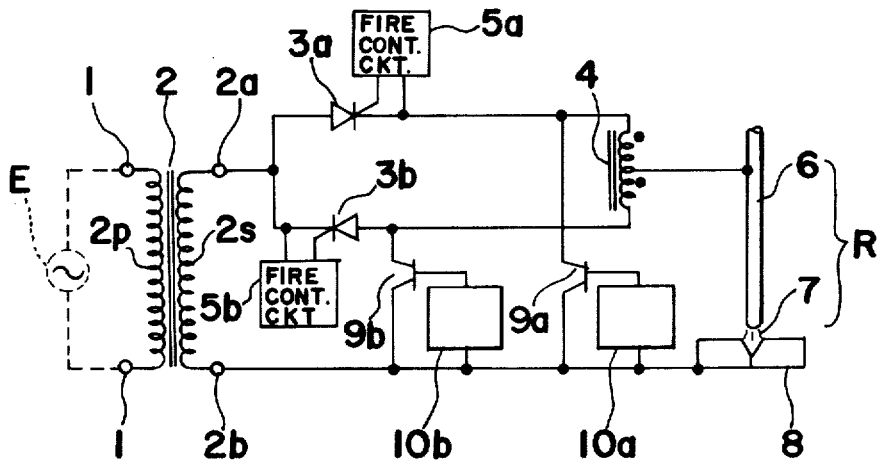
FIG. 30 is a circuit diagram showing a modification of a.c. arc welder shown in FIG. 7.

When the thyristor 3a is turned on at the moment T1, the current from the terminal 2a flows, in addition to that flowing through the load R, through the capacitor C5, inductor L1 and diode De to the terminal 2b for charging the capacitor C5. Accordingly, a side of the capacitor C5 which is in common with cathode side of the thyristor 9e is charged with positive polarity as illustrated in FIG. 15. Although the capacitor C5 may be charged without the employment of the inductor L1, the capacitor C5 can be charged with higher voltage than that from the terminal 2a if an inductor forming a resonance circuit with the capacitor C5 is provided. For this reason, the inductor L1 is coupled with the capacitor C5. When the polarity at the terminal 2a is changed from positive to negative at the moment T3, the terminals G and H produces a pulse (row m of FIG. 17) to turn the thyristor 9e on. Accordingly, the energy accumulated in the reactor 4a starts to dissipate through the thyristor 9e. During the dissipation of the energy, the capacitor C5 is maintained in the charged condition. Then, at the moment T4, the terminals E and F produces a pulse (row n of FIG. 17) to turn the thyristor 9f on. Thereupon, the capacitor C5 is discharged by a current flow through thyristor 9e in a reverse direction, thyristor 9f in a forward direction and inductor L1. Accordingly, by the discharge of the capacitor C5, the thyristor 9e is turned to non-conductive state. The waveform shown in a row p of FIG. 17 represents current flowing through the thyristor 9e. At the moment T4, the thyristor 3b is also turned on to start the flow of welding current through the load R in the reverse direction than before. During this flow of welding current, the capacitor C6 is charged. Then, at the moment T6, the thyristor 9g is turned on by a pulse (row g of FIG. 17) received from the terminals I and J to dissipate energy accumulated in the reactor 4b. Thereafter, at the moment T7, the thyristor 9h is conducted by a pulse (row h of FIG. 17) to discharge the capacitor C6. By the discharge of the capacitor C6, a reverse biased current flows through the thyristor 9g which counteracts on the forward biased current to turn the thyristor 9g to a non-conductive state. The waveform shown in a row i of FIG. 17 represents current flowing through the thyristor 9g. At the moment T7, the thyristor 3a is again turned on to start a new cycle of operation. It is to be noted that reactors 4a and 4b can be formed to have a common core as shown in FIG. 30.

PARALLEL TYPE

Figure 18:
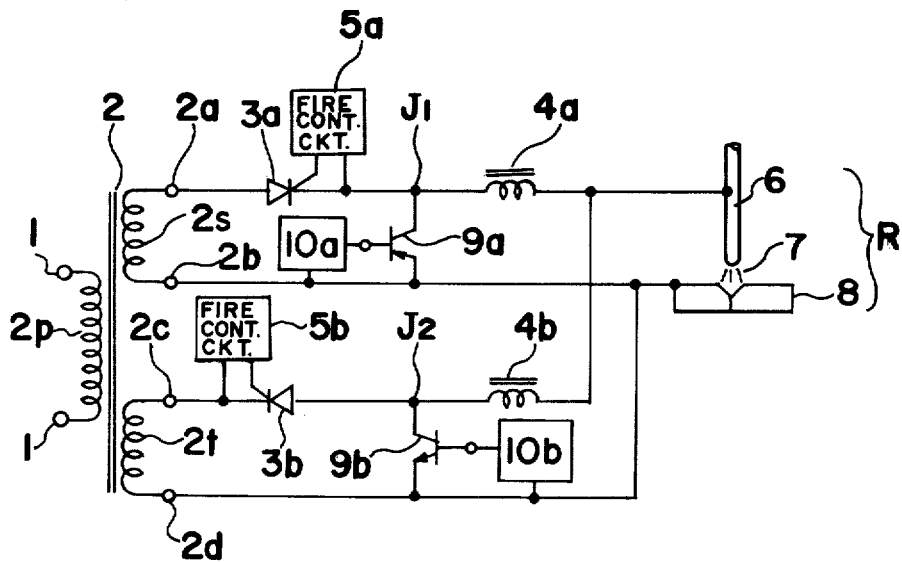
FIG. 18 is a circuit diagram of parallel type a.c. arc welder with transistor control system according to the present invention.

Referring to FIG. 18, there is shown a schematic circuit of a parallel type a.c. arc welder with transistor control system. The circuit includes welding transformer 2 having a primary winding 2p and two secondary windings 2s and 2t. Connected across the secondary winding 2s is a series circuit of thyristor 3a, reactor 4a and welding load R. Transistor 9a is connected between the junction J1 and the workpiece 8. A similar circuit having thyristor 3b, reactor 4b, transistor 9b is connected across the secondary winding 2t. The transistors 9a and 9b are coupled with switching circuits 10a and 10b, respectively, having a structure similar to those shown in FIG. 10. The operation of the parallel type a.c. arc welder with transistor control system is described below in connection with FIGS. 19a to 19d and FIG. 8a.

Figure 19A:
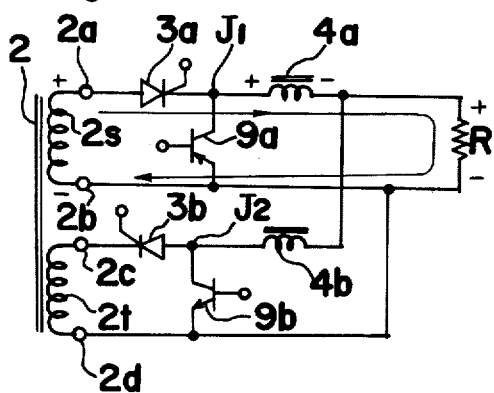
FIGS. 19a to 19d are circuit diagrams for explaining changed of current flow through the circuit of FIG. 18.
Figure 19B:
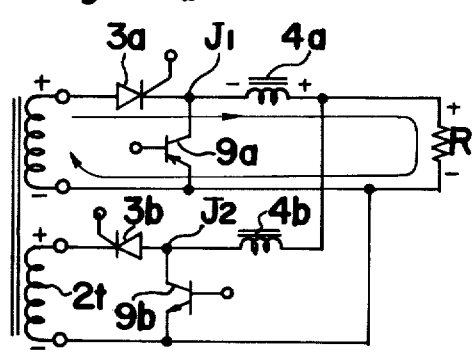
Figure 19C:
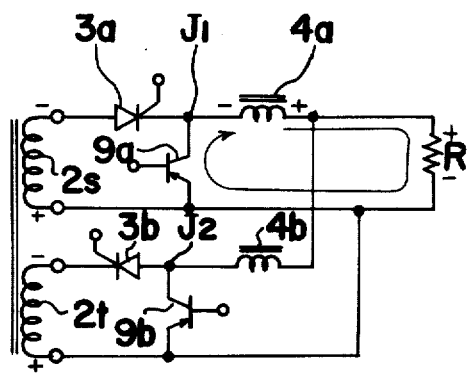
Figure 19D:
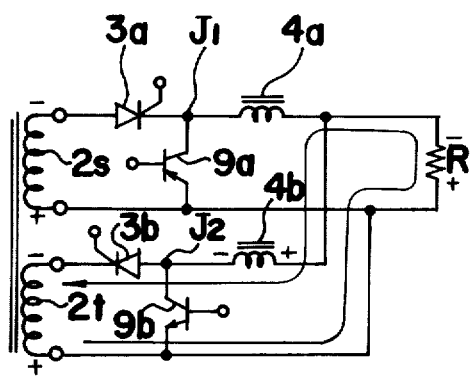

When the thyristor 3a is conducted at the moment T1, welding current flows from the terminal 2a, through the thyristor 3a, reactor 4a and welding load R to the terminal 2b, as indicated by an arrow shown in FIG. 19a. During the current flow, energy is accumulated in the reactor 4a. When the voltage across the load R becomes greater than that across the terminals 2a and 2b (moment T2), the energy accumulated in the reactor 4a starts to dissipate to aid the current from the source. Thus, the current continues to flow through the same path as before. Then, when the polarity of the voltage across the winding 2s is changed at the moment T3, the transistor 9a is conducted to flow the current from the reactor 4a therethrough, as indicated by an arrow shown in FIG. 19c. Then, at the moment T4, the thyristor 3b is conducted to flow the current as indicated by an arrow shown in FIG. 19d. During this current flow, energy is accumulated in the reactor 4b which is then dissipated in a similar manner described above to complete one cycle of operation.

Figure 20:
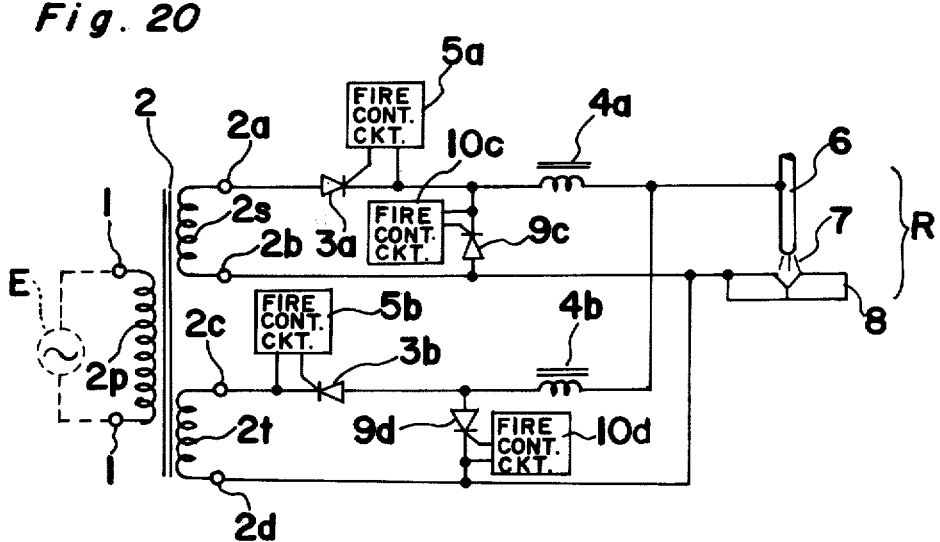
FIG. 20 is a circuit diagram of parallel type a.c. arc welder with gate turn-off thyristor control system according to the present invention.

Referring to FIG. 20, there is shown a schematic circuit of a parallel type a.c. arc welder with GTO thyristor control system. Instead of transistors 9a and 9b shown in FIG. 18, the welder of FIG. 20 includes GTO thyristors 9c and 9d which are coupled with fire control circuits 10c and 10d, respectively. The control circuits 10c and 10d have a network similar to those circuits 10c and 10d shown in FIG. 13. Since the a.c. welder of FIG.

20 operates in a manner similar to the welder of FIG. 18, a further description therefor is omitted.

Figure 21:
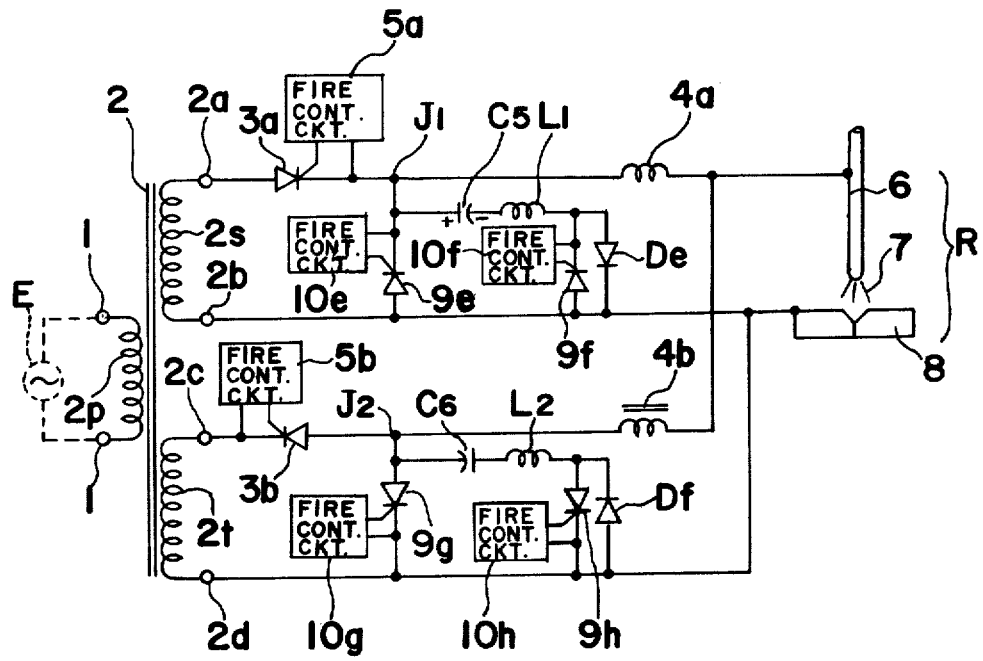
FIG. 21 is a circuit diagram of parallel type a.c. arc welder with thyristor control system according to the present invention.

Referring to FIG. 21, there is shown a schematic circuit of a parallel type a.c. arc welder with thyristor control system. This circuit employs thyristors 9e to 9h for establishing bypass circuits. The thyristors 9e to 9h are controlled in a manner similar to those thyristors 9e to 9h described above in connection to FIG. 16.

BRIDGED TYPE

Figure 22:
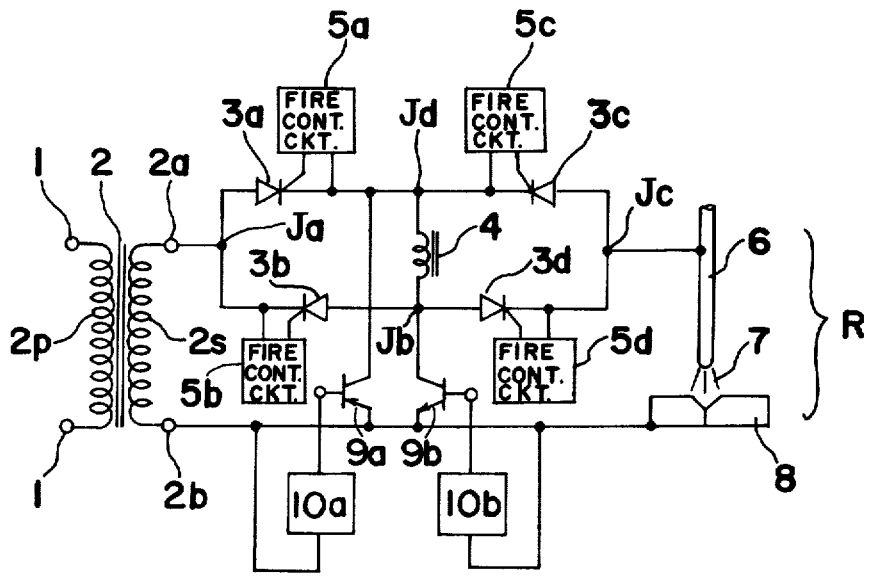
FIG. 22 is a circuit diagram of bridged type a.c. arc welder with transistor control system according to the present invention.

Referring to FIG. 22, there is shown a schematic circuit of a bridged type a.c. arc welder with transistor control system. The circuit includes welding transformer 2 having a primary winding 2p and a secondary winding 2s. A bridge circuit having four junctions Ja, Jb, Jc and Jd is connected between the terminal 2a of the secondary winding 2s and the electrode 6. The bridge circuit includes thyristor 3a connected between the junctions Ja and Jd, thyristor 3b connected between the junctions Jb and Ja, thyristor 3c connected between the junctions Jc and Jd, and thyristor 3d connected between the junctions Jb and Jc. A reactor 4 is connected between the junctions Jd and Jb. The bridged type welder of FIG. 22 further includes a transistor 9a connected between the junction Jd and the terminal 2b of the secondary winding, and a transistor 9b connected between the junction Jb and the terminal 2b. The switching circuits 10a and 10b similar to those shown in FIG. 10 are employed for controlling turning on and off states of the transistors 9a and 9b. The operation of the bridged type a.c. arc welder with transistor control system is described below in connection with FIGS. 23a to 23d.

Figure 23A:
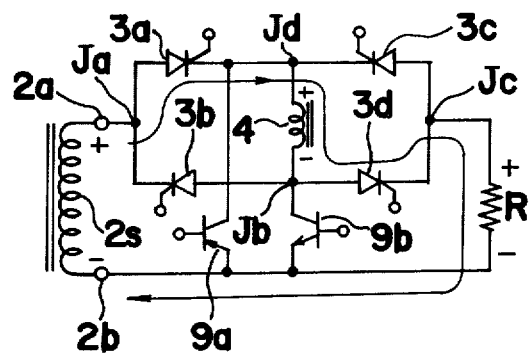
FIGS. 23a to 23d are circuit diagrams for explaining change of current flow through the circuit of FIG. 22.
Figure 23B:
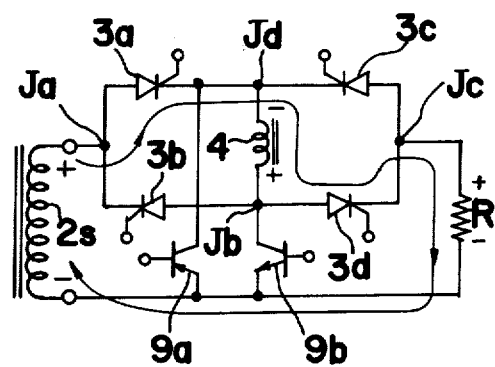
Figure 23C:
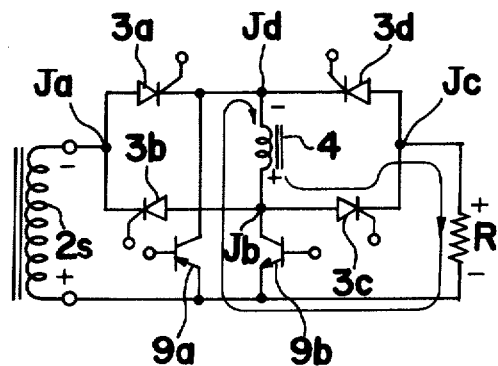
Figure 23D:
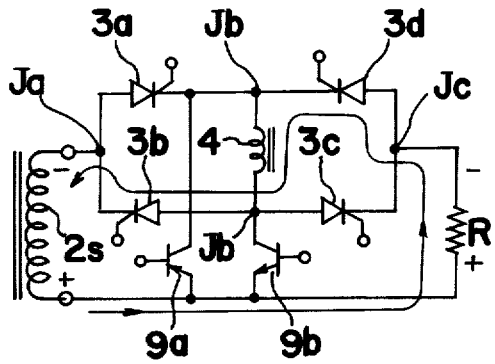

At the moment T1, the thyristors 3a and 3d are both conducted simultaneously to form a closed circuit through the terminal 2a, thyristor 3a, reactor 4, thyristor 3d, welding load R and terminal 2b to allow the welding current to flow therethrough as indicated by an arrow shown in FIG. 23a. During this current flow, energy is accumulated in the reactor 4. When the voltage across the load R becomes greater than that across the terminals 2a and 2b, the energy accumulated in the reactor 4 starts to dissipate to aid the current from the source. Thus, the current continues to flow through the same path as before, as indicated by an arrow shown in FIG. 23b. Then, when the polarity of the voltage across the winding 2s is changed at the moment T3, the transistor 9a is turned on to flow the current from the reactor 4 therethrough, as indicated by an arrow shown in FIG. 23c. Then, at the moment T4, the thyristors 3b and 3d are conducted to flow current as indicated by an arrow shown in FIG. 23d. During this current flow, energy is accumulated in the reactor 4 which is then dissipated in a similar manner described above to complete one cycle of operation.

Figure 24:
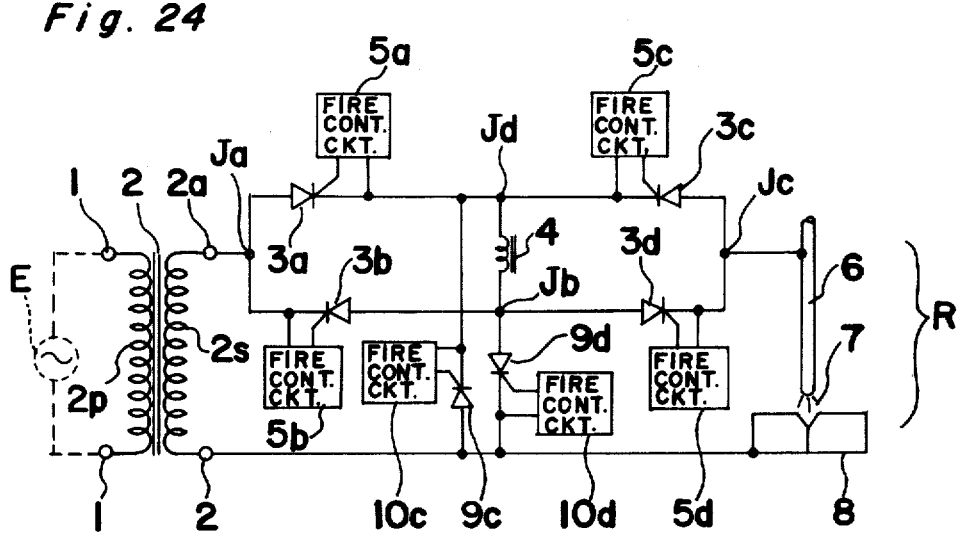
FIG. 24 is a circuit diagram of bridged type a.c. arc welder with gate turn-off thyristor control system according to the present invention.

Referring to FIG. 24, there is shown a schematic circuit of a bridged type a.c. arc welder with GTO thyristor control system. In place of transistors 9a and 9b, the circuit of FIG. 24 has GTO thyristors 9c and 9d which are coupled with fire control circuits 10c and 10d, respectively. Since the operation is similar to that described above, a further description therefor is omitted for the sake of brevity.

Figure 25:
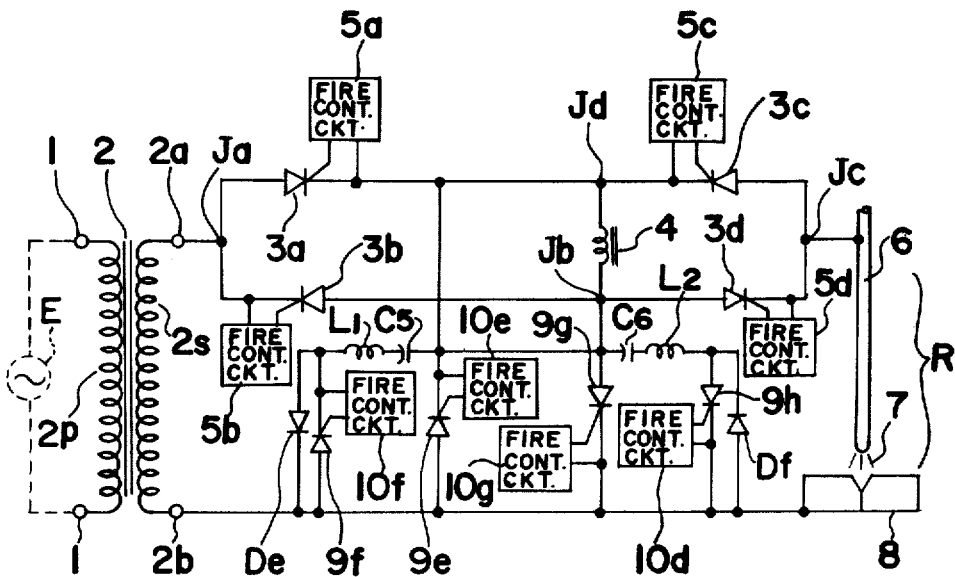
FIG. 25 is a circuit diagram of bridged type a.c. arc welder with thyristor control system according to the present invention.

Referring to FIG. 25, there is shown a schematic circuit of a bridged type a.c. arc welder with thyristor control system. This circuit employs thyristors 9e to 9h for establishing bypass circuits. The thyristors 9e to 9h are controlled in a manner similar to those thyristors 9e to 9h described above in connection with FIG. 16.

DOUBLE CONTROL TYPE

Figure 26:
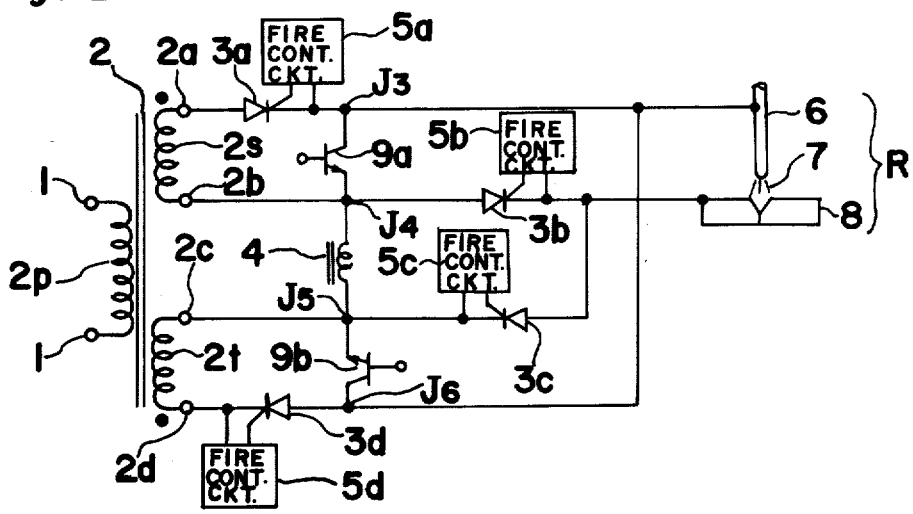
FIG. 26 is a circuit diagram of double control type a.c. arc welder with transistor control system according to the present invention.

Referring to FIG. 26, there is shown a schematic circuit of a double control type a.c. arc welder with transistor control system. The circuit includes welding transformer 2 having a primary winding 2p and two secondary windings 2s and 2t. Connected across the secondary winding 2s is a series circuit of thyristor 3a, welding load R and thyristor 3b. A junction J3 between the thyristor 3a and the electrode 6 is connected, through a transistor 9a, to a junction J4 between the terminal 2b and the thyristor 3b. Similarly, a series circuit of thyristor 3c, welding load R and thyristor 3d is connected across the secondary winding 2t. A junction J5 between the terminal 2c and the thyristor 3c is connected, through a transistor 9b, to a junction J6 between the electrode 6 and the thyristor 3d. A reactor 4 is connected between the junctions J4 and J5. The transistors 9a and 9b are coupled with switching circuits 10a and 10b, respectively, for controlling the turning on and off of the transistors 9a and 9b. The operation of the double control type a.c. arc welder with transistor control system is described below in connection with FIGS. 27a to 27d.

Figure 27A:
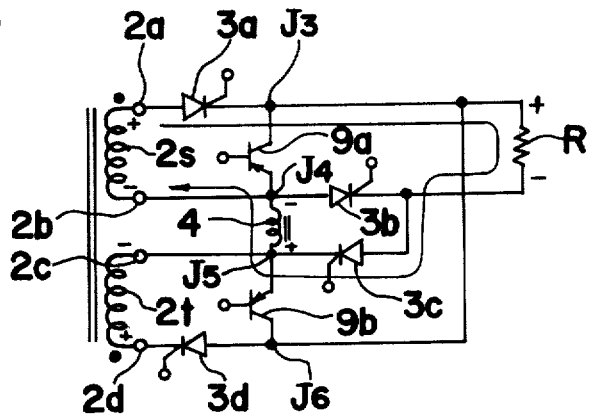
FIGS. 27a to 27d are circuit diagrams for explaining change of current flow through the circuit of FIG. 26.
Figure 27B:
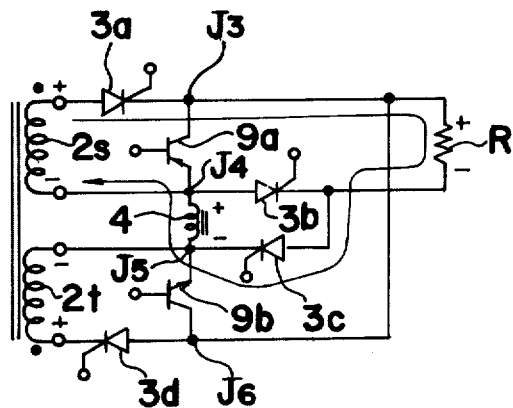
Figure 27C:
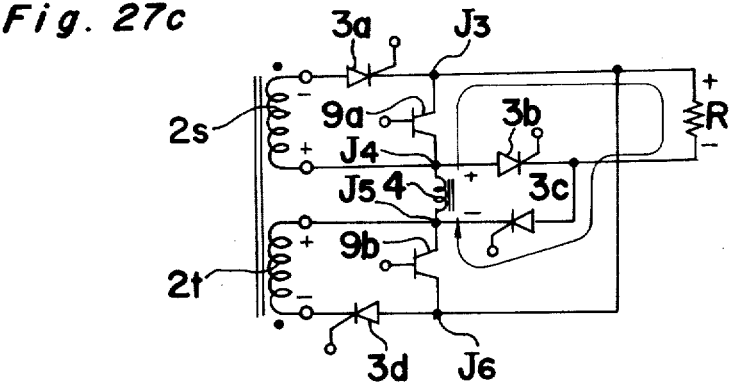
Figure 27D:
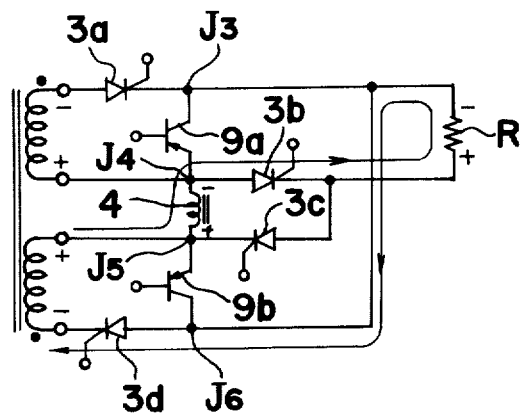

At the moment T1, the thyristors 3a and 3c are both conducted simultaneously to allow the welding current to flow through a closed circuit of terminal 2a, thyristor 3a, welding load R, thyristor 3c, reactor 4 and terminal 2b, as indicated by an arrow shown in FIG. 27a. During this current flow, energy is accumulated in the reactor 4. When the voltage across the load R becomes greater than that across the terminals 2a and 2b, the energy accumulated in the reactor 4 starts to dissipate to aid the current from the source. Thus, the current continues to flow through the same path as before, as indicated by an arrow shown in FIG. 27b. Then, when the polarity of the voltage across the winding 2s is changed, the transistor 9a is turned on to flow current from the reactor 4 therethrough, as indicated by an arrow shown in FIG. 27c. Then, at the moment T4, the thyristors 3b and 3d are conducted to flow current as indicated by an arrow shown in FIG. 27d. During this current flow, energy is accumulated in the reactor 4 which is then dissipated in a similar manner described above to complete one cycle of operation.

Figure 28:
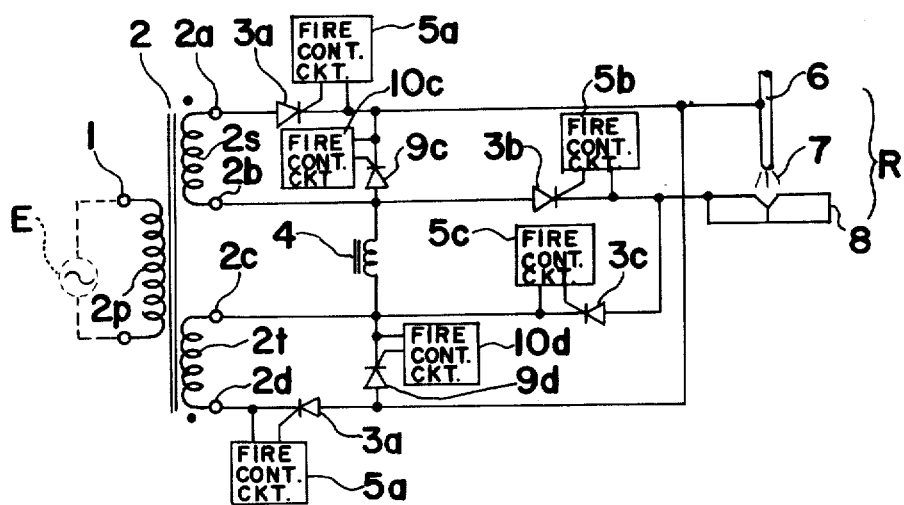
FIG. 28 is a circuit diagram of double control type a.c. arc welder with gate turn-off thyristor control system according to the present invention.

Referring to FIG. 28, there is shown a schematic circuit of a double control type a.c. arc welder with GTO thyristor control system. In place of transistors 9a and 9b, the circuit of FIG. 28 has GTO thyristors 9c and 9d which are coupled with fire control circuits 10c and 10d, respectively. Since the operation is similar to that described above, a further description therefor is omitted.

Figure 29:
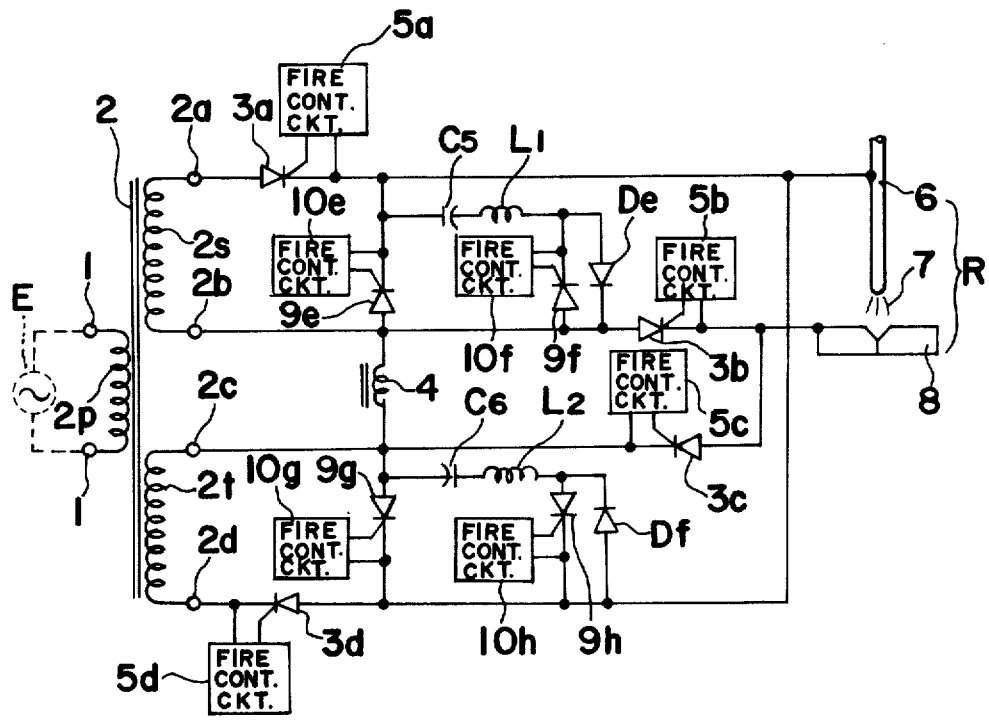
FIG. 29 is a circuit diagram of double control type a.c. arc welder with thyristor control system according to the present invention.

Referring to FIG. 29, there is shown a schematic circuit of a double control type a.c. arc welder with thyristor control system. This circuit employs thyristors 9e to 9h for establishing bypass circuits. Since the thyristors 9e to 9h are controlled in a manner similar to those described above in connection with FIG. 16, a further description is omitted.

Although the present invention has been fully described with reference to preferred embodiments, many modifications and variations thereof will now be apparent to those skilled in the art, and the scope of the present invention is therefore to be limited not by the details of the preferred embodiments described above, but by the terms of the appended claims.

What is claimed is:

1. An a.c. arc welder comprising:
   a transformer including a primary winding adapted to receive a single phase a.c. current from an a.c. power source and at least one secondary winding;
   an electrode adapted to produce a welding arc between said electrode and a workpiece, said electrode, arc and workpiece constituting a welding load;
   a first welding current path established between opposite ends of said secondary winding and including a first phase control circuit, a first reactor and said welding load which are connected in series between opposite ends of said secondary winding, said first phase control circuit being responsive to each of positive polarity half-cycles of the a.c. power and provided for allowing current from said secondary winding to pass therethrough in a controlled phase, said first reactor provided for accumulating an electric power when the voltage from said secondary winding is higher than that across the welding load and dissipating said accumulated power when the voltage from said secondary winding is lower than that across the welding load;
   a second welding current path established between opposite ends of said secondary winding and including a second phase control circuit, a second reactor and said welding load which are connected in series in said second welding current path, said second phase control circuit being responsive to each of negative polarity half-cycles of the a.c. power and provided for allowing current from said secondary winding to pass therethrough in a controlled phase, said second reactor provided for accumulating an electric power when the voltage from said secondary winding is higher than that across the welding load and dissipating said accumulated power when the voltage from said secondary winding is lower than that across the welding load;
   a first bypass circuit connected in parallel to said first reactor and said welding load, said first bypass circuit including a first switching circuit for conducting said first bypass circuit during a period of time which is within a period of dissipation of the power accumulated in the first reactor; and
   a second bypass circuit connected in parallel to said second reactor and said welding load, said second bypass circuit including a second switching circuit for conducting said second bypass circuit during a period of time which is within a period of dissipation of the power accumulated in the second reactor.

2. An a.c. arc welder as claimed in claim 1, wherein each of said first and second bypass circuits is formed by a transistor.

3. An a.c. arc welder as claimed in claim 1, wherein each of said first and second bypass circuits is formed by a GTO thyristor.

4. An a.c. arc welder as claimed in claim 1, wherein each of said first and second bypass circuits is formed by a thyristor.

5. An a.c. arc welder as claimed in claim 1, wherein said first reactor has a core in common with that of the second reactor.

6. An a.c. arc welder as claimed in claim 1, wherein said transformer includes one secondary winding, said first and second welding current paths being established between opposite ends of said one secondary winding.

7. An a.c. arc welder as claimed in claim 1, wherein said transformer includes two secondary windings, said first and second welding current paths being established between opposite ends of respective one of the two secondary windings.

8. An a.c. arc welder as claimed in claim 6 or 7, wherein said first welding current path further includes a first gate means which is connected in series to said first phase control circuit, said first reactor and said welding load, said first gate means being opened during a period from the start of current flow through said first phase control circuit until the start of current flow through the second phase control circuit.

9. An a.c. arc welder as claimed in claim 6 or 7, wherein said second welding current path further includes a second gate means which is connected in series to said second phase control circuit, said second reactor and said welding load, said second gate means being opened during a period from the start of current flow through said second phase control circuit until the start of current flow through said first phase control circuit.

* * * * *